(12) United States Patent
Lin et al.

(10) Patent No.: US 11,950,248 B2
(45) Date of Patent: Apr. 2, 2024

(54) DYNAMIC ADAPTATION ON PDCCH MONITORING BEHAVIOR ACROSS MULTI-TRPS

(71) Applicant: Samsung Electronics Co., Ltd., Suwon-si (KR)

(72) Inventors: Qiongjie Lin, Sunnyvale, CA (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 17/248,228

(22) Filed: Jan. 14, 2021

(65) Prior Publication Data
US 2021/0243741 A1 Aug. 5, 2021

Related U.S. Application Data

(60) Provisional application No. 62/967,880, filed on Jan. 30, 2020, provisional application No. 62/969,332, filed on Feb. 3, 2020, provisional application No. 63/121,547, filed on Dec. 4, 2020.

(51) Int. Cl.
*H04W 72/23* (2023.01)
*H04W 76/28* (2018.01)

(52) U.S. Cl.
CPC .......... *H04W 72/23* (2023.01); *H04W 76/28* (2018.02)

(58) Field of Classification Search
CPC ... H04L 5/0035; H04L 5/0094; H04L 5/0053; H04L 5/001; H04W 76/28; H04W 52/0216; H04W 72/042
See application file for complete search history.

(56) References Cited

U.S. PATENT DOCUMENTS

| | | | |
|---|---|---|---|
| 2019/0363843 A1 | 11/2019 | Gordaychik | |
| 2020/0008235 A1* | 1/2020 | Sarkis | H04L 5/0007 |
| 2020/0053776 A1* | 2/2020 | John Wilson | H04L 5/001 |
| 2020/0196346 A1* | 6/2020 | Khoshnevisan | H04W 72/044 |
| 2020/0322109 A1* | 10/2020 | Yu | H04B 7/0404 |
| 2021/0045119 A1* | 2/2021 | Song | H04L 5/003 |

(Continued)

OTHER PUBLICATIONS

"5G; NR; Physical channels and modulation (3GPP TS 38.211 version 16.2.0 Release 16)", ETSI TS 138 211 V16.2.0, Jul. 2020, 136 pages.

(Continued)

*Primary Examiner* — Chi Ho A Lee

(57) ABSTRACT

A method for operating a user equipment (UE) includes receiving a configuration for a set of search space sets and receiving a PDCCH that provides a downlink control information (DCI) format. A search space set provides parameters for physical downlink control channel (PDCCH) receptions. The parameters include time-frequency resources of a control resource set (CORESET) for the PDCCH receptions and a group index for the CORESET. The DCI format includes a field providing an indication of a CORESET group index. The method further includes determining based on the indication, a group of search space sets and receiving PDCCHs according to the group of search space sets. The group of search space sets includes each search space set from the set of search space sets that is associated with a CORESET having the CORESET group index.

20 Claims, 12 Drawing Sheets

(56) References Cited

U.S. PATENT DOCUMENTS

| | | | |
|---|---|---|---|
| 2021/0076324 A1* | 3/2021 | Kaikkonen | H04W 76/28 |
| 2022/0052824 A1* | 2/2022 | Kim | H04L 1/1896 |
| 2022/0116183 A1* | 4/2022 | Gao | H04L 1/1861 |
| 2022/0232603 A1* | 7/2022 | Xiao | H04W 72/1273 |
| 2022/0240187 A1* | 7/2022 | Guo | H04L 5/0053 |
| 2022/0271873 A1* | 8/2022 | Gao | H04L 1/1861 |

OTHER PUBLICATIONS

"5G; NR; Multiplexing and channel coding (3GPP TS 38.212 version 16.2.0 Release 16)", ETSI TS 138 212 V16.2.0, Jul. 2020, 154 pages.

"5G; NR; Physical layer procedures for control (3GPP TS 38.213 version 16.2.0 Release 16)", ETSI TS 138 213 V16.2.0, Jul. 2020, 180 pages.

"5G; NR; Physical layer procedures for data (3GPP TS 38.214 version 16.2.0 Release 16)", ETSI TS 138 214 V16.2.0, Jul. 2020, 167 pages.

"5G; NR; Physical layer measurements (3GPP TS 38.215 version 16.2.0 Release 16)", ETSI TS 138 215 V16.2.0, Jul. 2020, 30 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

"5G; NR; Medium Access Control (MAC) protocol specification (3GPP TS 38.321 version 16.1.0 Release 16)", ETSI TS 138 321 V16.1.0, Jul. 2020, 153 pages.

International Search Report and Written Opinion of the International Searching Authority in connection with International Application No. PCT/KR2021/001172 dated Apr. 23, 2021, 6 pages.

LG Electronics, "Physical layer design of DL signals and channels for NR-U", R1-1912387, 3GPP TSG RAN WG1 #99, Reno, USA, Nov. 18-22, 2019, 16 pages.

Panasonic, "DL signals and channels for NR-U", R1-1913098, 3GPP TSG-RAN WG1 #99, Reno, USA, Nov. 18-22, 2019, 10 pages.

Huawei et al., "Enhancements on multi-TRP/panel transmission", R1-1911902, 3GPP TSG RAN WG1 Meeting #99, Reno, USA, Nov. 18-22, 2019, 16 pages.

Huawei et al., "Enhancements on multi-TRP/panel transmission", R1-1910073, 3GPP TSG RAN WG1 Meeting #98bis, Chongqing, China, Oct. 14-20, 2019, 31 pages.

* cited by examiner

DYNAMIC ADAPTATION ON PDCCH MONITORING BEHAVIOR ACROSS MULTI-TRPS

CROSS-REFERENCE TO RELATED APPLICATIONS AND CLAIM OF PRIORITY

The present application claims priority to U.S. Provisional Patent Application No. 62/967,880, filed on Jan. 30, 2020; U.S. Provisional Patent Application No. 62/969,332, filed on Feb. 3, 2020; and U.S. Provisional Patent Application No. 63/121,547, filed on Dec. 4, 2020. The content of the above-identified patent document is incorporated herein by reference.

TECHNICAL FIELD

The present disclosure relates generally to wireless communication systems and, more specifically, the present disclosure relates to dynamic adaptation on physical downlink control channel (PDCCH) monitoring behavior across multiple transmit-receive point (TRPs).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates dynamic adaptation on PDCCH monitoring behavior across multi-TRPs.

In one embodiment, a user equipment (UE) is provided. The UE includes a transceiver configured to receive a configuration for a set of search space sets and a PDCCH that provides a downlink control information (DCI) format. A search space set provides parameters for PDCCH receptions. The parameters include time-frequency resources of a control resource set (CORESET) for the PDCCH receptions and a group index for the CORESET. The DCI format includes a field providing an indication of a CORESETs group index. The UE also includes a processor operably connected to the transceiver. The processor is configured to determine, based on the indication, a group of search space sets. The group of search space sets includes each search space set from the set of search space sets that is associated with a CORESET having the CORESET group index. The transceiver is further configured to receive PDCCHs according to the group of search space sets.

In another embodiment, a base station is provided. The base station includes a transceiver configured to transmit a configuration for a set of search space sets and a PDCCH that provides a DCI format. A search space set provides parameters for PDCCH transmissions. The parameters include time-frequency resources of a CORESET for the PDCCH transmissions and a group index for the CORESET. The DCI format includes a field providing an indication of a CORESETs group index. The base station also includes a processor operably connected to the transceiver. The processor is configured to determine a group of search space sets to indicate via the indication. The group of search space sets includes each search space set from the set of search space sets that is associated with a CORESET having the CORESET group index. The transceiver is further configured to transmit PDCCHs according to the group of search space sets.

In yet another embodiment, a method for operating a UE is provided. The method includes receiving a configuration for a set of search space sets and receiving a PDCCH that provides a DCI format. A search space set provides parameters for PDCCH receptions. The parameters include time-frequency resources of a CORESET for the PDCCH receptions and a group index for the CORESET. The DCI format includes a field providing an indication of a CORESET group index. The method further includes determining based on the indication, a group of search space sets and receiving PDCCHs according to the group of search space sets. The group of search space sets includes each search space set from the set of search space sets that is associated with a CORESET having the CORESET group index.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.2.0, "NR; Physical channels and modulation"; 3GPP TS 38.212 v16.2.0, "NR; Multiplexing and Channel coding"; 3GPP TS 38.213 v16.2.0, "NR; Physical Layer Procedures for Control"; 3GPP TS 38.214 v16.2.0, "NR; Physical Layer Procedures for Data"; 3GPP TS 38.215 v16.0.0, "NR; Physical layer measurements"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

Figure 1:
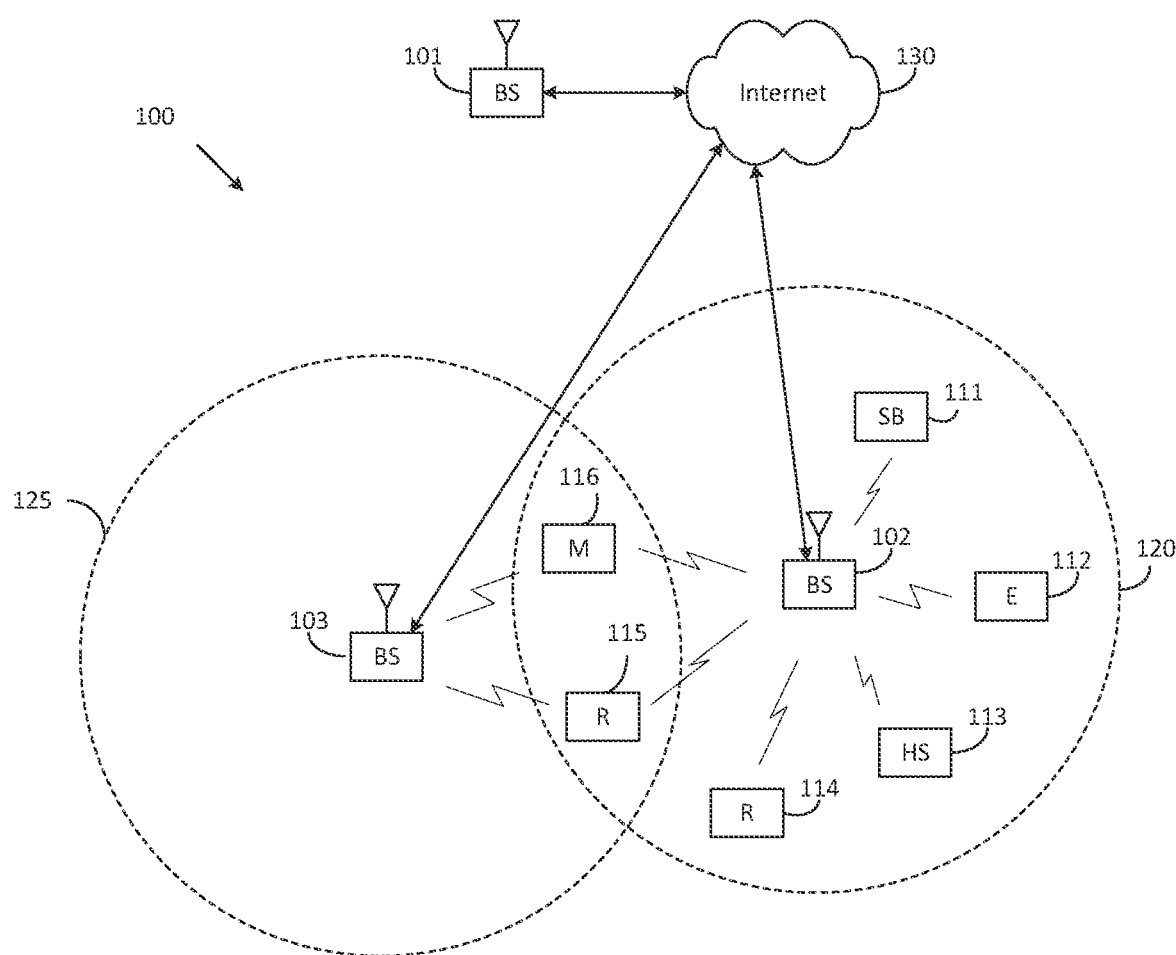
FIG. 1 illustrates an example wireless network according to embodiments of the present disclosure.
Figure 2:
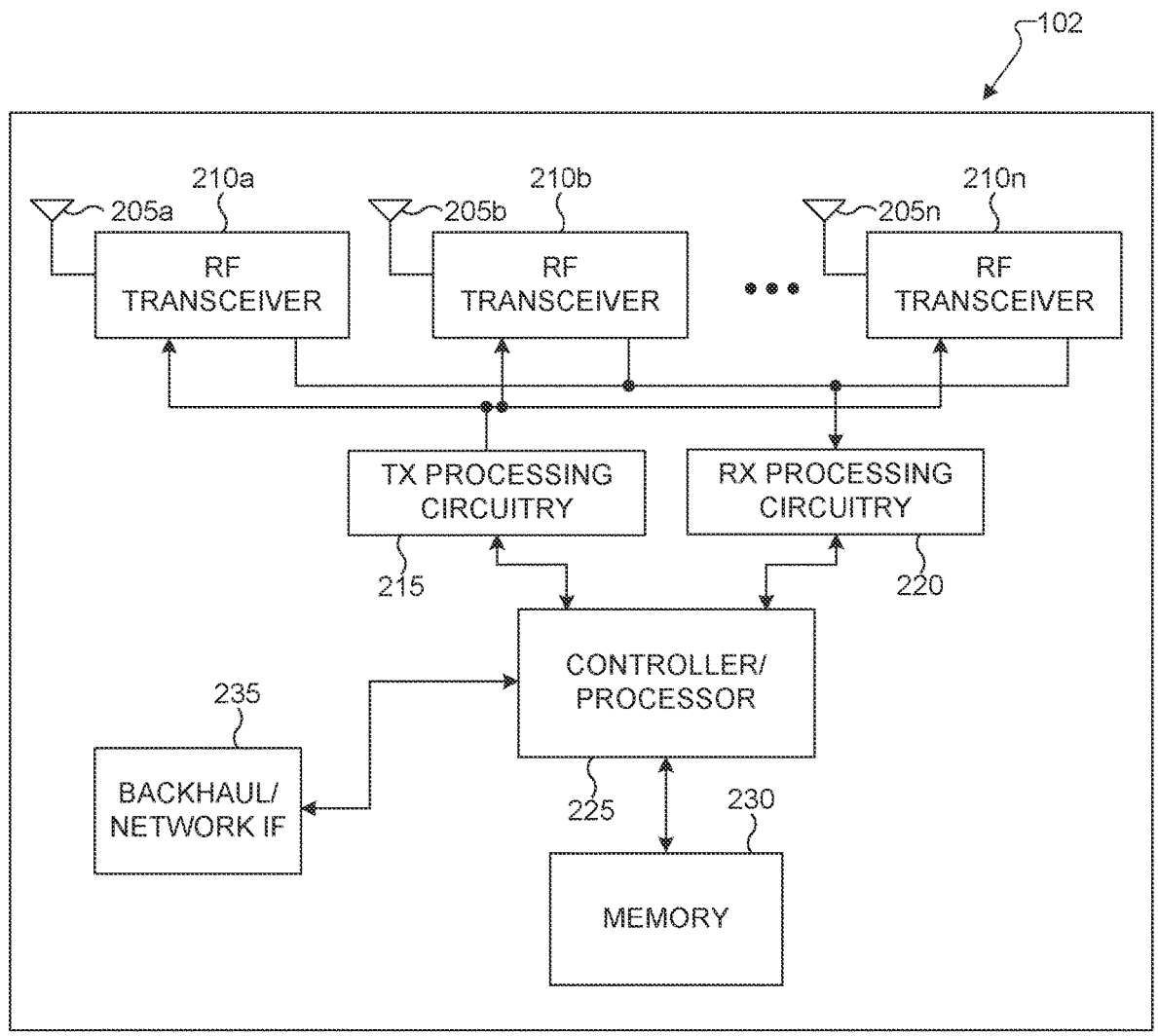
FIG. 2 illustrates an example gNB according to embodiments of the present disclosure.
Figure 3:
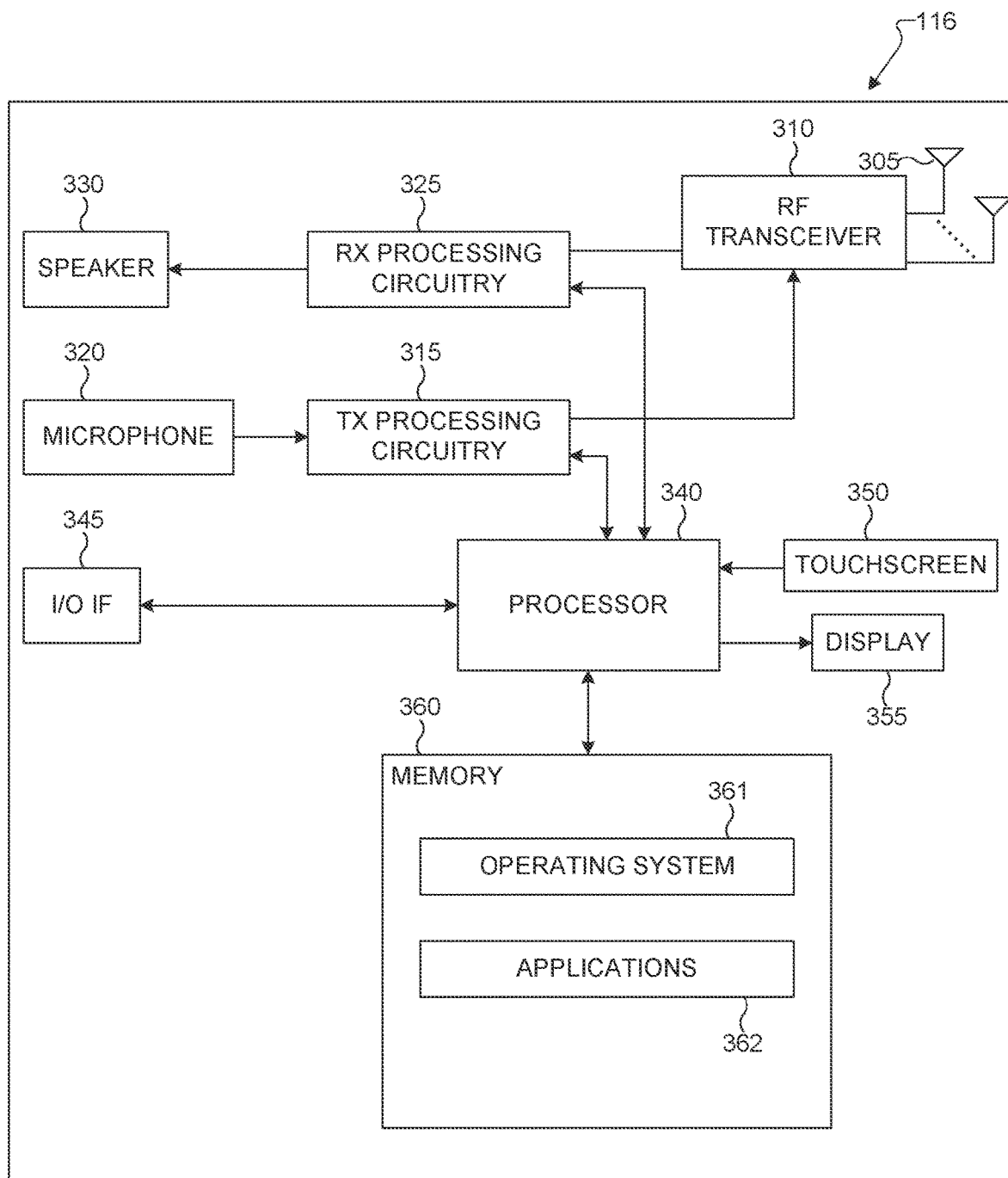
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for beam management and coverage enhancements for semi-persistent and configured grant transmission. In certain embodiments, and one or more of the gNBs 101-103 includes circuitry, programing, or a combination thereof, for beam management and coverage enhancements for semi-persistent and configured grant transmission.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
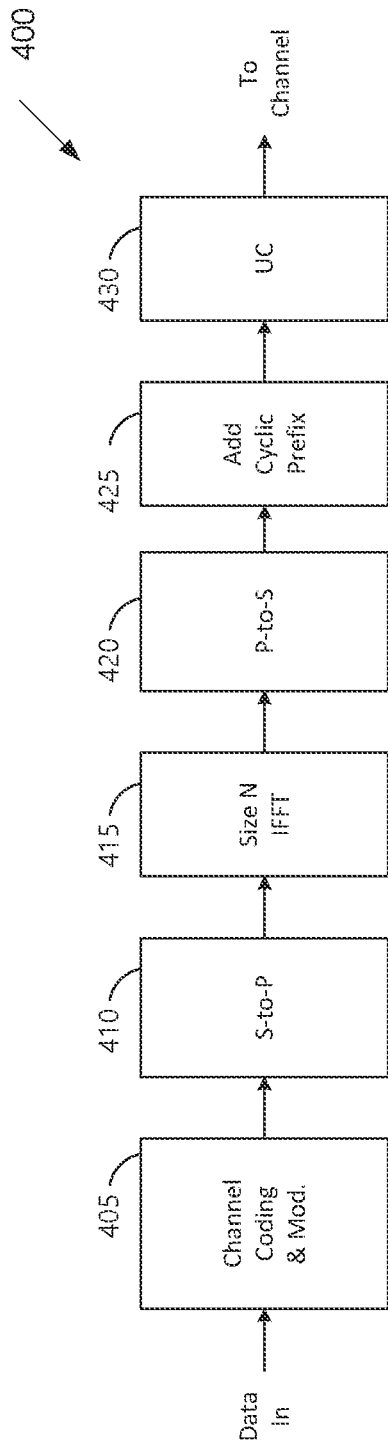
FIGS. 4 and 5 illustrate example wireless transmit and receive paths according to this disclosure.
Figure 5:
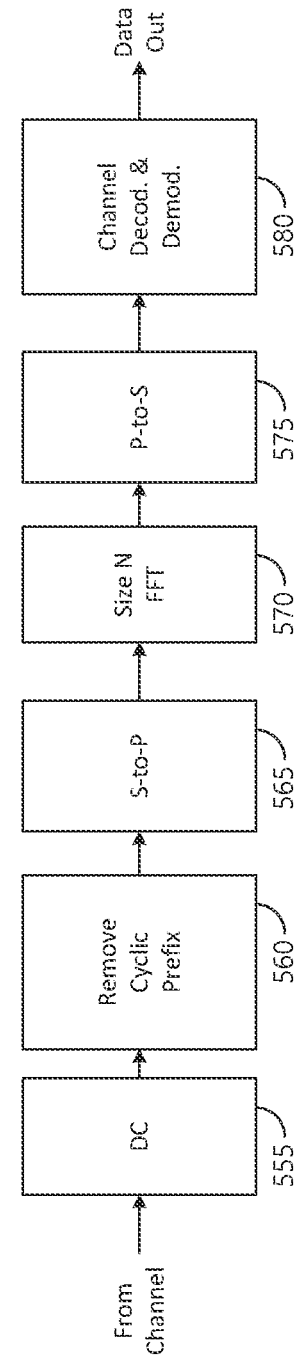

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

For each DL bandwidth part (BWP) configured to a UE in a serving cell, the UE can be provided by higher layer signaling a number of control resource sets (CORESETs). For each CORESET, the UE is provided: a CORESET index p; a demodulation-reference signal (DM-RS) scrambling sequence initialization value; a precoder granularity for a number of REGs in frequency where the UE can assume use of a same DM-RS precoder; a number of consecutive symbols; a set of resource blocks; control channel element-to-resource block (RB) groups (CCE-to-REG) mapping parameters; an antenna port quasi co-location, from a set of antenna port quasi co-locations, indicating quasi co-location information of the DM-RS antenna port for PDCCH reception; and an indication for a presence or absence of a transmission configuration indication (TCI) field for DCI format 1_1 transmitted by a PDCCH in CORESET p.

For each DL BWP configured to a UE in a serving cell, the UE is provided by higher layers with a number of search space sets where, for each search space set from the number search space sets, the UE is provided the following: a search space set index s; an association between the search space set s and a CORESET p; a PDCCH monitoring periodicity of $k_s$ slots and a PDCCH monitoring offset of $o_s$ slots; a PDCCH monitoring pattern within a slot, indicating first symbol(s) of the control resource set within a slot for PDCCH monitoring; a number of PDCCH candidates $M_s^{(L)}$ per CCE aggregation level L; an indication that search space set s is either a common search space set or a UE-specific search space set; and a duration of $T_s < k_s$ slots indicating a number of slots that the search space set s exists.

For a search space set s associated with CORESET p, the CCE indexes for aggregation level L corresponding to PDCCH candidate $m_{s,n_{CI}}$ of the search space set in slot $n_{s,f}^{\mu}$ for a serving cell corresponding to carrier indicator field value $n_{CI}$ (also referred to as search space) are given as:

$$L \cdot \left\{ \left( Y_{p,n_{s,f}^{\mu}}, + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i$$

where, for any common search space, $Y_{p,n_{s,f}^{\mu}}=0$; for a UE-specific search space, $Y_{p,n_{s,f}^{\mu}}=(A_p \cdot Y_{p,n_{s,f}^{\mu}-1}) \mod D$, $Y_{p,-1}=n_{RNTI} \neq 0$, $A_p=39827$ for p mod 3=0, $A_p=39829$ for p mod 3=1, $A_p=39839$ for p mod 3=2, and D=65537; i=0, . . . , L–1; $N_{CCE,p}$ is the number of CCEs, numbered from 0 to $N_{CCE,p}-1$, in CORESET p; $n_{CI}$ is the carrier indicator field value if the UE is configured with a carrier indicator field; otherwise, including for any common search space, $n_{CI}=0$; $m_{s,n_{CI}}=0, \ldots, M_{p,s,n_{CI}}-1$, where $M_{s,n_{CI}}^{(L)}$ is the number of PDCCH candidates the UE is configured to monitor for aggregation level L for a serving cell corresponding to $n_{CI}$ and a search space set s; for any common search space, $M_{s,max}^{(L)}=M_{s,0}^{(L)}$; for a UE-specific search space, $M_{s,max}^{(L)}$ is the maximum of $M_{s,n_{CI}}^{(L)}$ across all configured $n_{CI}$ values for a CCE aggregation level L of search space set s in control resource set p; and the radio network temporary identification (RNTI) value used for $n_{RNTI}$.

A physical uplink control channel (PUCCH) can be transmitted according to one from multiple PUCCH formats as described in NR/LTE specification. A PUCCH format corresponds to a structure that is designed for a particular uplink control information (UCI) payload range as different UCI payloads require different PUCCH transmission structures to improve an associated UCI block error rate (BLER). A PUCCH transmission is also associated with a TCI state providing a spatial domain filter for a PUCCH transmission as described in NR/LTE specification. A PUCCH can be used to convey hybrid automatic repeat request-acknowledgement (HARQ-ACK) information, a scheduling request (SR), or periodic/semi-persistent channel state information (CSI) and their combinations.

A UE can be configured for operation with multiple BWP in a DL system BW (DL BWPs) and in an UL system BW (UL BWP) as described in NR/LTE specification. At a given time, only one DL BWP and only one UL BWP are active for the UE. Configurations of various parameters, such as search space set configuration for PDCCH reception or PUCCH resources for PUCCH transmission, can be separately provided for each respective BWP.

A primary purpose for BWP operation is to enable power savings for the UE. When the UE has data to transmit or receive, a large BWP can be used and, for example, search space sets can be more than one and have short monitoring periodicity. When the UE does not have data to transmit or receive, a small BWP can be used and, for example, a single search space set can be configured with longer monitoring periodicity.

NR Rel-16 supports adaptation on minimum scheduling offset K0/K2 based on an indication carried in a DCI format 1_1 or 0_1. Therefore, a UE can reduce power consumption by relaxing PDCCH processing, avoid buffering PDSCH reception, and operates in micro sleep mode during the active time in RRC_CONNECTED state. However, in order to relax the entire UE processing timeline, it's necessary to consider relaxation on other UE processing procedures, such as PDSCH reception and corresponding acknowledgement/negative acknowledgement (ACK/NACK) feedback.

Therefore, there is a need to support relaxing PDSCH processing and ACK/NACK feedback related timing to increase UE power savings. There is another need to introduce a restriction for a minimum time for processing of a PDSCH reception. Finally, there is a need to determine an application delay for adaptations to a minimum time for processing of a PDSCH reception.

The present disclosure relates to a pre-5G or 5G communication system to be provided for supporting higher data rates beyond 4G communication system such as LTE. The disclosure relates to introduce minimum applicable value restriction for a PDSCH processing related timing. The disclosure also relates to support adaptation on minimum applicable value for a PDSCH processing related timing based on an indication in a DCI format. This disclosure additionally relates to determine an application delay for applying a newly indicated restriction on minimum applicable value for a PDSCH processing related timing.

In one embodiment, a minimum applicable value restriction is provided for a PDSCH processing related timing provided by a gNB to a UE. A UE can apply the minimum applicable value restriction to a PDSCH processing related timing, wherein the PDSCH is scheduled with cell-RNTI (C-RNTI), configured scheduling-RNTI (CS-RNTI) or modulation coding scheme-cell-RNTI (MCS-C-RNTI) in at least UE-specific search space set. The minimum applicable value restriction to a PDSCH processing related timing is not applied when the PDSCH transmission is scheduled with C-RNTI, CS-RNTI or MCS-RNTI in common search space set associated with CORESET0 or when PDSCH transmission is scheduled with system information-RNTI (SI-RNTI) or random access-RNTI (RA-RNTI). The minimum applicable value for a PDSCH processing related timing is referred as K^PDSCH_min in this disclosure for the simplicity of expression.

Figure 6:
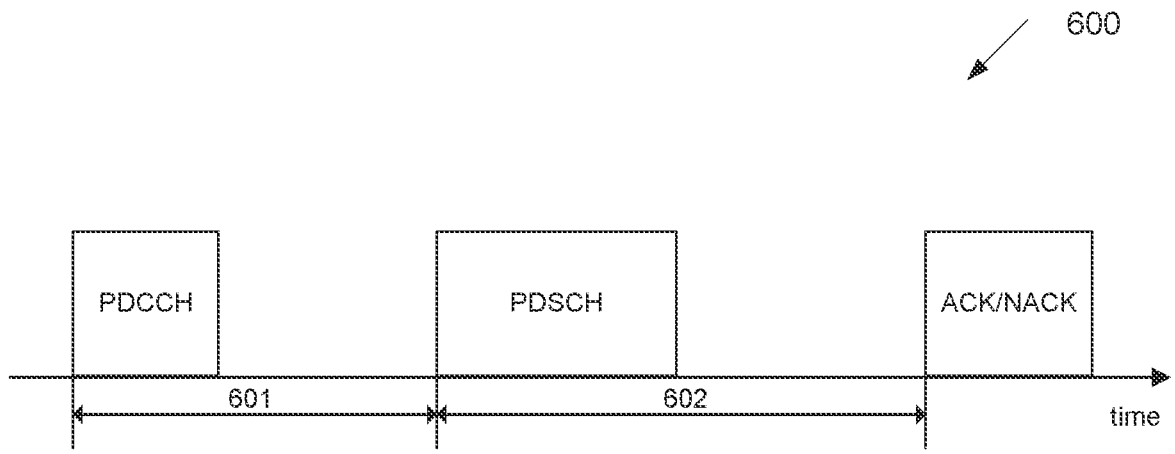
FIG. 6 illustrate an example UE operation with respect to a PDSCH processing timing according to embodiments of the present disclosure.

FIG. 6 illustrate an example UE operation with respect to a PDSCH processing timing 600 according to embodiments of the present disclosure. The embodiment shown in FIG. 6 is for illustration only.

A minimum applicable value for a PDSCH processing time, $K_{min}^{PDSCH}$, can be defined in terms of an absolute time value, or in terms of a number of symbols for a subcarrier configuration (SCS), or in terms of a number of slots for a SCS.

In one example, a PDSCH processing time can be defined as a time between a last symbol of a PDSCH reception providing one or more transport blocks and a first symbol of a PUCCH transmission with HARQ-ACK information in response to the reception of the transport blocks.

In another example, in order to account for parallel processing for decoding of code blocks in earlier symbols of a PDSCH reception and for demodulation of data information symbols in later symbols of the PDSCH reception, a PDSCH processing time can be defined as a time between a first symbol of the PDSCH reception and a first symbol of a PUCCH transmission with HARQ-ACK information in response to the reception of transport blocks (or code blocks) in the PDSCH reception. A minimum applicable value for a PDSCH processing time, $K_{min}^{PDSCH}$, can be defined in terms of an absolute time value or in terms of a number of symbols for an SCS.

In yet another example, a PDSCH processing time can be defined as time offset between the end or start of a slot of a PDSCH reception providing one or more transport blocks and the beginning of a slot of a PUCCH transmission with HARQ-ACK information in response to the reception of the transport blocks.

With reference to slots of a PUCCH transmission, a UE does not expect to be scheduled by a downlink control information (DCI) format to receive a PDSCH in a slot n and for the DCI format to indicate to the UE to transmit a PUCCH with HARQ-ACK information in response to the PDSCH reception in slot $n+K_1$ when a number of slots (or a time) between the start of a PDSCH reception in slot n and a start slot of a resource for the PUCCH transmission in slot $n+K_1$ is smaller than a number of slots (or a time) corresponding to $K_{min}^{PDSCH}$.

In yet another example, a PDSCH processing time can be defined as a time offset between the end or start of a slot of a PDCCH reception that provides a DCI format scheduling a PDSCH reception and the beginning of a slot of a PUCCH transmission with HARQ-ACK information in response to a decoding result of transport blocks provided by the PDSCH reception.

When a UE is provided with a minimum applicable value $K_{min}^{PDSCH}$ for the PDSCH processing time, the UE does not expect to be scheduled by a DCI format in a PDCCH reception to receive a PDSCH and to transmit a HARQ-ACK information in response to the PDSCH reception with $K_1+K_0<K_{min}^{PDSCH}$. The UE assumes that $K_1+K_0 \geq K_{min}^{PDSCH}$.

As illustrated in FIG. 6, $K_0$ 601 is a slot offset between the PDCCH reception and the PDSCH reception and is indicated by a time domain resource assignment field in the DCI format or is provided by higher layer signaling. $K_1$ 602 is a HARQ-ACK feedback timing for a PUCCH transmission with HARQ-ACK information in response to the PDSCH reception and is indicated by a PDSCH-to-HARQ_feedback timing indicator field in a DCI format that schedules the PDSCH reception or is provided by higher layer signaling.

In yet another example, a PDSCH processing time can be defined as a time between a last symbol of a PDCCH reception (last symbol of a CORESET where the PDCCH is received) that provides a DCI format scheduling a PDSCH reception and a first symbol of a PUCCH transmission with HARQ-ACK information in response to a decoding results of transport blocks in the PDSCH reception.

With reference to slots of a PUCCH transmission, a UE does not expect to be scheduled by a DCI format to receive a PDSCH in a slot n and for the DCI format to indicate to the UE to transmit a PUCCH with HARQ-ACK information in response to the PDSCH reception in slot $n+K_1$ when a number of symbols (or a time) between a last symbol of a PDSCH reception in slot n and a first symbol of a resource for the PUCCH transmission in slot $n+K_1$ is smaller than a number of symbols (or a time) corresponding to $K_{min}^{PDSCH}$.

In one embodiment, an adaptation of $K_{min}^{PDSCH}$ by a UE is provided, as defined in the examples of the aforementioned embodiment, based on an indication transmitted by a gNB to the UE In one example to adapt $K_{min}^{PDSCH}$, a joint indication applies for adaptation of $K_{min}^{PDSCH}$ and/or a minimum applicable $K_0$, denoted as $K_{0,min}$, and/or minimum applicable $K_2$, denoted as $K_{2,min}$. The joint indication for $K_{min}^{PDSCH}$ and/or $K_{0\ min}$ and/or $K_{2\ min}$ can be an indicator for a UE processing timeline adaptation in a DCI format scheduling a PDSCH reception or PUSCH transmission. The joint indication can indicate a row index to a predetermined joint adaptation table. The joint adaptation table can be provided to the UE by higher layers. Each row of the joint adaptation table can include values for $K_{min}^{PDSCH}$, and/or values for $K_{0\ min}$ for PDSCH reception, and/or values for $K_{2\ min}$ for PUSCH transmission.

A UE can be provided with one or more candidate value(s) for $K_{min}^{PDSCH}$ by a higher layer parameter that is referred to as minimumPDSCHProcessingTime in this disclosure. The candidate values are provided to the UE for each configured UL BWP or DL BWP of a serving cell. In one example, candidate values for $K_{min}^{PDSCH}$ can be in unit of one slot, and in the range from $v_{min}$ to $v_{max}$, where for example $v_{min}$ is 0 or 1, and $v_{max}$ is 15 or 32. In another example, candidate values for $K_{min}^{PDSCH}$ can be in unit of a number of symbols, such as one symbol, and in the range from $v_{min}$ to $v_{max}$, where for example $v_{min}$ is 1 or 2, and $v_{max}$ is 256 or 512.

When an adaptation on $K_{min}^{PDSCH}$ based on an indication from physical layer is supported, the UE apply a default value of $K_{min}^{PDSCH}$ for the active DL BWP or active UL BWP before receiving any indication from physical layer to adapt or update the value for $K_{min}^{PDSCH}$ in the active DL BWP or active UL BWP. The UE can determine the default value as any of the following: (1) a default value is the minimum value among all candidate $K_{min}^{PDSCH}$ value(s) configured for the active DL BWP or active UL BWP; (2) a default value is the lowest indexed candidate $K_{min}^{PDSCH}$ value configured for the active DL BWP or active UL BWP; (3) a default value is the maximum value among all candidate $K_{min}^{PDSCH}$ value(s) configured for the active DL BWP or active UL BWP; and (4) a default value is zero when only one candidate $K_{min}^{PDSCH}$ value is configured for the active DL BWP or active UL BWP. In this case, there is no restriction applied to PDSCH processing related timing. TABLE 1 provides an example of a joint adaptation table. TABLE 2 provides another example of a joint adaptation table. TABLE 3 provides yet another example of a joint adaptation table.

TABLE 1

Joint indication of $K_{min}^{PDSCH}$ and minimum applicable $K_0/K_2$

| Bit field mapped to index | Minimum applicable $K_0$ for the active DL BWP, if minimumSchedulingOffset is configured for the DL BWP | Minimum applicable $K_2$ for the active UL BWP, if minimumSchedulingOffset is configured for the UL BWP | $K_{min}^{PDSCH}$ for the active DL/UL BWP, if minimumPDSCHProcessingTime is configured for the DL/UL BWP |
|---|---|---|---|
| 0 | The first value configured by minimumSchedulingOffset for the active DL BWP | The first value configured by minimumSchedulingOffset for the active UL BWP | The first value configured by minimumPDSCHProcessingTime for the active DL/UL BWP |
| 1 | The second value configured by minimumSchedulingOffset for the active DL BWP if the second value is configured; 0 otherwise | The second value configured by minimumSchedulingOffset for the active UL BWP if the second value is configured; 0 otherwise | The second value configured by minimumPDSCHProcessingTime for the active DL/UL BWP if the second value is configured; 0 otherwise |

TABLE 2

Joint indication of $K_{min}^{PDSCH}$ and minimum applicable $K_0$

| Bit field mapped to index | Minimum applicable $K_0$ for the active DL BWP, if minimumSchedulingOffset is configured for the DL BWP | $K_{min}^{PDSCH}$ for the active DL/UL BWP, if minimumPDSCHProcessingTime is configured for the DL/UL BWP |
|---|---|---|
| 0 | The first value configured by minimumSchedulingOffset for the active DL BWP | The first value configured by minimumPDSCHProcessingTime for the active DL BWP |
| 1 | The second value configured by minimumSchedulingOffset for the active DL BWP if the second value is configured; 0 otherwise | The second value configured by minimumPDSCHProcessingTime for the active DL BWP if the second value is configured; 0 otherwise |

TABLE 3

Joint indication of $K_{min}^{PDSCH}$ and minimum applicable $K_2$

| Bit field mapped to index | Minimum applicable $K_2$ for the active DL BWP, if minimumSchedulingOffset is configured for the DL BWP | $K_{min}^{PDSCH}$ for the active DL/UL BWP, if minimumPDSCHProcessingTime is configured for the DL/UL BWP |
|---|---|---|
| 0 | The first value configured by minimumSchedulingOffset for the active UL BWP | The first value configured by minimumPDSCHProcessingTime for the active UL BWP |
| 1 | The second value configured by minimumSchedulingOffset for the active DL BWP if the second value is configured; 0 otherwise | The second value configured by minimumPDSCHProcessingTime for the active UL BWP if the second value is configured; 0 otherwise |

Figure 7:
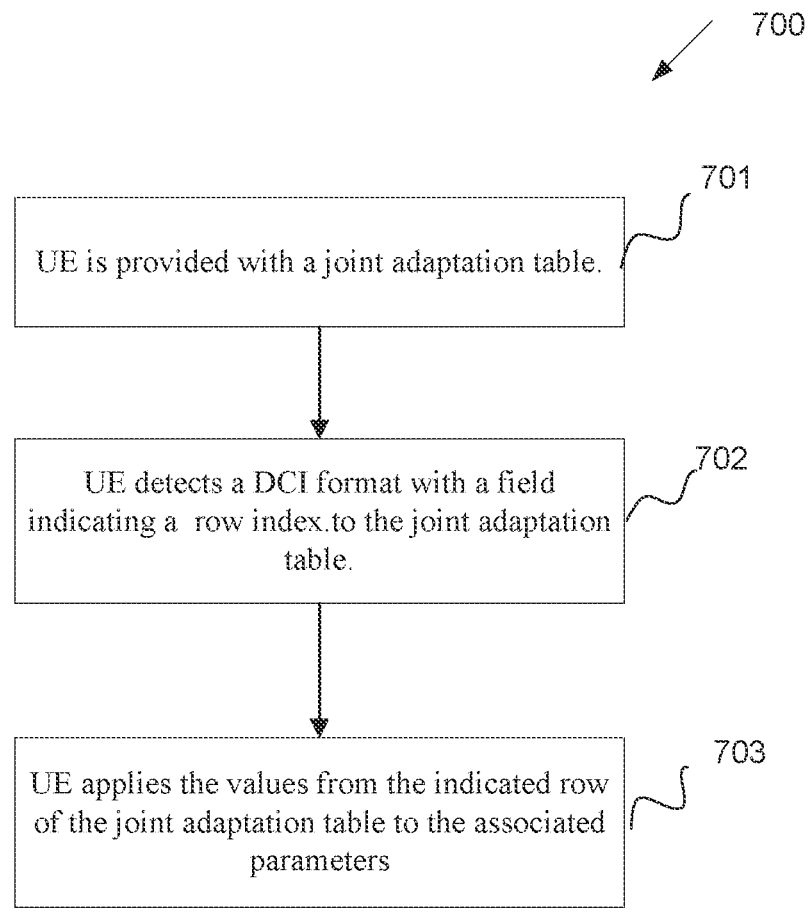
FIG. 7 illustrates a flowchart of a method for adaptation on $K_{min}^{PDSCH}$ according to embodiments of the present disclosure.

FIG. 7 illustrates a flowchart of a method 700 for adaptation on $K_{min}^{PDSCH}$ according to embodiments of the present disclosure. For example, the method 700 may be preformed by a UE such as UE 116 in FIG. 1. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, a UE is provided with a joint adaptation table with candidate values for more than one UE processing timeline relaxation related parameters, including $K_{min}^{PDSCH}$ at step 701. The UE detects a DCI format, such as a DCI format scheduling a PDSCH reception, that includes a field to indicate a row of the joint adaptation table at step 702. The UE then applies the values from the indicated row of the joint adaptation table to all associated adaptive parameters, respectively, at step 703.

A UE can report one or more preferred value(s) for $K_{min}^{PDSCH}$ to a serving gNB as assistance information for UE power savings. The UE can report a preferred $K_{min}^{PDSCH}$ value separately for each SCS value. The UE can also report a first preferred $K_{min}^{PDSCH}$ value when the UE is configured to receive only one transport block in a PDSCH and a second preferred $K_{min}^{PDSCH}$ value when the UE is configured to receive up to two transport blocks in a PDSCH.

In one example to adapt $K_{min}^{PDSCH}$ can be derived from a minimum applicable $K_0$ value. A UE determines $K_{min}^{PDSCH}$, for example such that $K_{min}^{PDSCH}=K_{0,min}+D_0$, where $K_{0,min}$ is the minimum applicable $K_0$ value, and $D_0$ is an offset relative to $K_{0,min}$. In one example, $D_0$ can be defined in the specification of the system operation, for example to be equal to 0 or 1. In another example, $D_0$ can be provided to the UE by higher layers per BWP or per serving cell or per UE. In yet another example, $D_0$ is a UE capability parameter and is reported by the UE to a serving gNB. If $D_0$ is zero, the UE assumes a same value for $K_{min}^{PDSCH}$ and $K_{0,min}$. When a UE receives an adaptation on minimum applicable value of $K_0$, for example based on an indication in a DCI format scheduling a PDSCH reception, the UE also updates the value for $K_{min}^{PDSCH}$.

Figure 8:
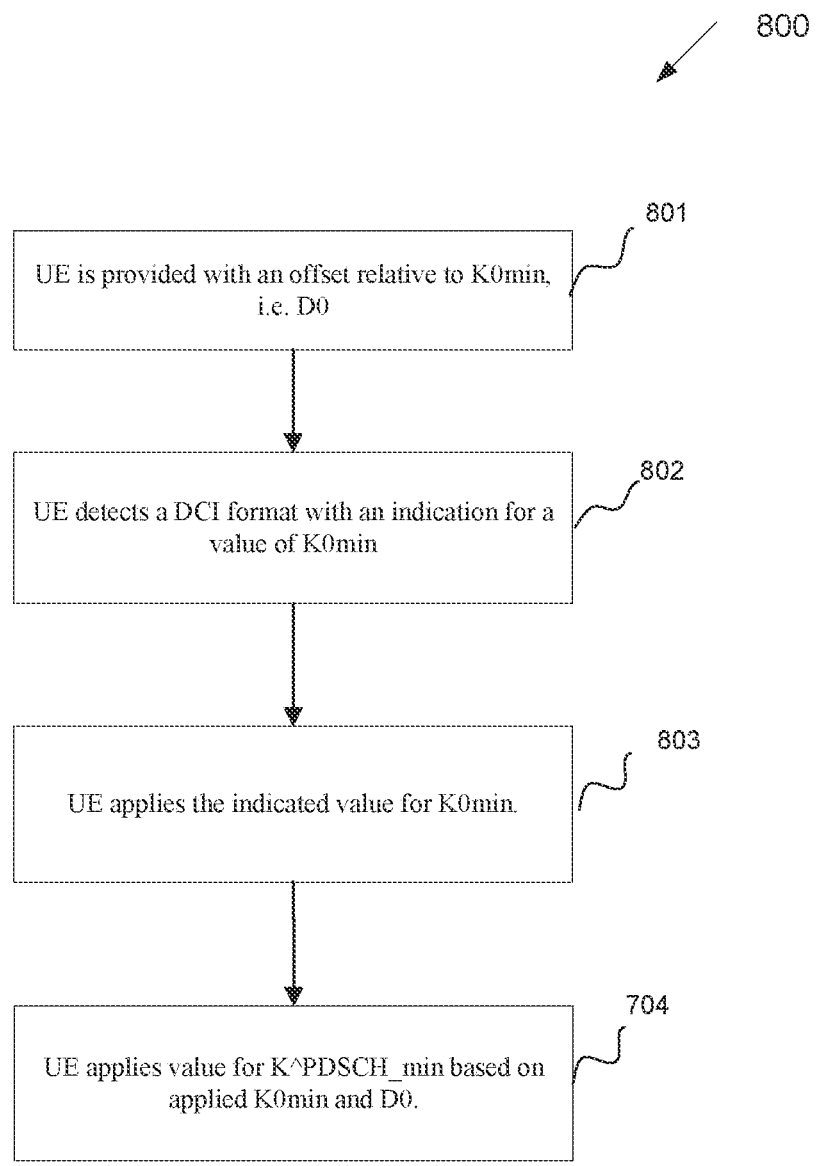
FIG. 8 illustrates another flowchart of a method for adaptation on $K_{min}^{PDSCH}$ according to embodiments of the present disclosure.

FIG. 8 illustrates another flowchart of a method 800 for adaptation on $K_{min}^{PDSCH}$ according to embodiments of the present disclosure. For example, the method 800 may be preformed by a UE such as UE 116 in FIG. 1. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, a UE is provided with an offset relative to $K_{0,min}$ for determining the value for $K_{min}^{PDSCH}$, i.e. $D_0$, at step 801. The UE detects a DCI format with an indication for a value of $K_{0,min}$, at step 802. The UE applies the indicated value for $K_{0,min}$, at step 803. The UE then applies value for $K_{min}^{PDSCH}$ based on applied $K_{0,min}$ and $D_0$, such that $K_{min}^{PDSCH}=K_{0,min}+D_0$ at step 804.

In one example to adapt $K_{min}^{PDSCH}$, $K_{min}^{PDSCH}$ can be derived from minimum applicable $K_2$. A UE determines $K_{min}^{PDSCH}$, such that $K_{min}^{PDSCH}=K_{2,min}+D_2$, where $K_{2,min}$ is the minimum applicable $K_2$, and $D_2$ is an offset relative to $K_{2,min}$. In one example, $D_2$ can be defined in the specification of the system operation, for example, to be 0 or 1. In another example, $D_2$ can be provided to the UE by higher layers, where $D_2$ is a parameter configured per BWP or per a serving cell or per UE. In yet another example, $D_2$ is a UE capability parameter and is reported by the UE to a serving gNB. If $D_2$ is zero, the UE assumes same value for $K_{min}^{PDSCH}$ and $K_{2,min}$. When a UE receives an adaptation on minimum applicable $K_2$, for example based on an indication in DCI format scheduling a PUSCH transmission, the UE also updates the value for $K_{min}^{PDSCH}$.

Figure 9:
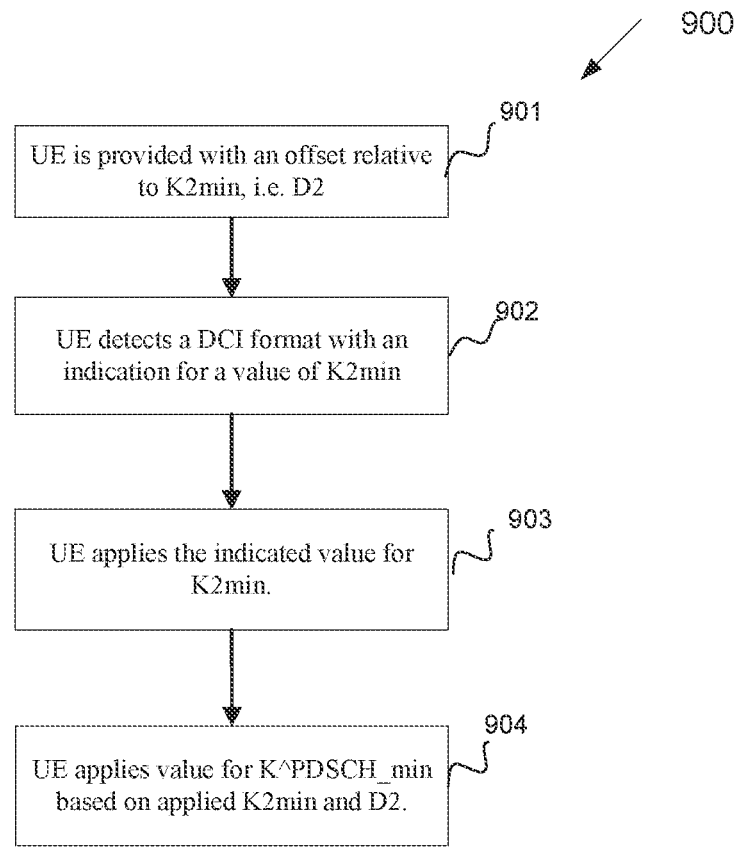
FIG. 9 illustrates yet another flowchart of a method for adaptation on $K_{min}^{PDSCH}$ according to embodiments of the present disclosure.

FIG. 9 illustrates yet another flowchart of a method 900 for adaptation on $K_{min}^{PDSCH}$ according to embodiments of the present disclosure. For example, the method 900 may be preformed by a UE such as UE 116 in FIG. 1. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, a UE is provided with an offset relative to $K_{2,min}$ for determining a value for $K_{min}^{PDSCH}$, i.e. $D_2$, at step 901. The UE detects a DCI format with an indication for a value of $K_{2,min}$, at step 902. The UE applies the indicated value for $K_{2,min}$, at step 903. The UE then applies a value for $K_{min}^{PDSCH}$ based on applied $K_{2,min}$ and $D_2$, such that $K_{min}^{PDSCH}=K_{2,min}+D_2$, at step 904.

In one example to adapt $K_{min}^{PDSCH}$, $K_{min}^{PDSCH}$ can be indicated by a new field in a DCI format, such as a DCI format scheduling a PDSCH reception. If candidate values of $K_{min}^{PDSCH}$ are not provided, the size of the field is zero; otherwise, the size of the field $N_{K,PDSCH}$ is determined by the number of candidate values, $N_{K,PDSCH}^{values}$, such that $N_{K,PDSCH}=\max(\text{ceil}(\log_2(N_{K,PDSCH}^{values})),1)$. A value v of the field in a DCI format, indicates the (v+1)-th candidate value. When only one candidate value is provided, a field value of "0" can indicate the candidate value and a field value of "1" can indicate 0 or no restriction to PDSCH processing time.

A UE can be provided with one or more candidate value(s) for $K_{min}^{PDSCH}$ by a higher layer parameter, referred as minimumPDSCHProcessingTime in this disclosure. The candidate values are provided to the UE for each configured UL BWP or DL BWP for a serving cell. A candidate value for $K_{min}^{PDSCH}$ can be in unit of one slot or of a number of symbols, as previously described. When an adaptation on $K_{min}^{PDSCH}$ based on an indication by a field in a DCI format is supported, the UE can apply a default value of $K_{min}^{PDSCH}$ for the active DL BWP or active UL BWP before receiving an indication to adapt or update the value for $K_{min}^{PDSCH}$ in the active DL BWP or active UL BWP.

The UE can determine the default value for $K_{min}^{PDSCH}$ as any of the following: (1) a default value is the minimum value among all candidate $K_{min}^{PDSCH}$ value(s) configured for the active DL BWP or active UL BWP; (2) a default value is the lowest indexed candidate $K_{min}^{PDSCH}$ value configured for the active DL BWP or active UL BWP; (3) a default value is the maximum value among all candidate $K_{min}^{PDSCH}$ value(s) configured for the active DL BWP or active UL BWP; and (4) a default value is zero when only one candidate $K_{min}^{PDSCH}$ value is configured for the active DL BWP or active UL BWP. In this case, there is no restriction to PDSCH processing time.

Figure 10:
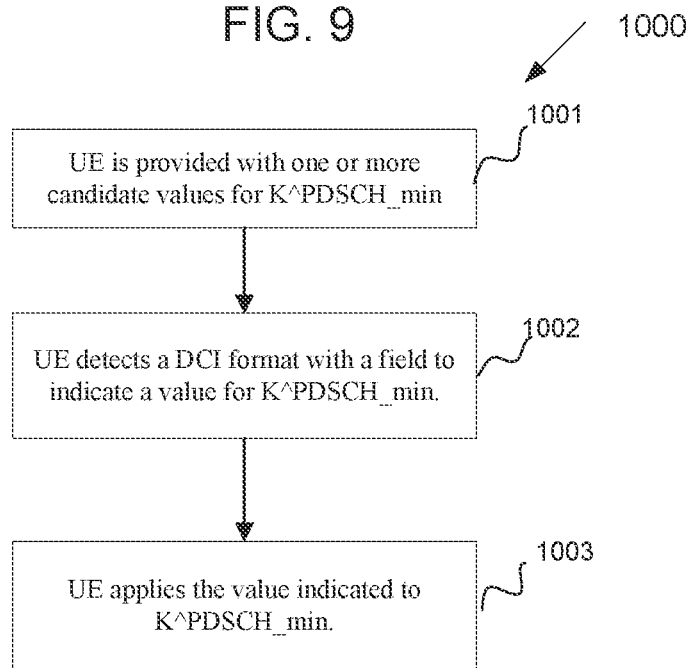
FIG. 10 illustrates yet another flowchart of a method for adaptation on $K_{min}^{PDSCH}$ according to embodiments of the present disclosure.

FIG. 10 illustrates yet another flowchart of a method 1000 for adaptation on $K_{min}^{PDSCH}$ according to embodiments of the present disclosure. For example, the method 1000 may be preformed by a UE such as UE 116 in FIG. 1. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, a UE is provided with one or more candidate values for $K_{min}^{PDSCH}$, at step 1001. The UE detects a DCI format, such as a DCI format scheduling a PDSCH reception, that includes a field indicating one of the predetermined $K_{min}^{PDSCH}$ candidate values, at step 1002. The UE then applies the value indicated by the field in the received DCI format to determine a $K_{min}^{PDSCH}$ value, at step 1003.

A UE can report to a serving gNB one or more preferred value(s) for $K_{min}^{PDSCH}$ as assistance information for UE power savings. The UE can report a preferred $K_{min}^{PDSCH}$ value separately for each SCS value. The UE can also report a first preferred $K_{min}^{PDSCH}$ value when the UE is configured to receive only one transport block in a PDSCH and a second preferred $K_{min}^{PDSCH}$ value when the UE is configured to receive up to two transport blocks in a PDSCH.

In one embodiment, an application delay is provided for an update of a minimum applicable value for a PDSCH processing time, $K_{min}^{PDSCH}$, as defined in the aforementioned embodiment of this disclosure. When a UE receives an indication to adapt value of $K_{min}^{PDSCH}$, for example through a DCI format scheduling a PDSCH reception, the UE can determine a time for the indicated $K_{min}^{PDSCH}$ value to be applied, while a current $K_{min}^{PDSCH}$ value remains applicable until the indicated value becomes effective after an application delay.

Figure 11:
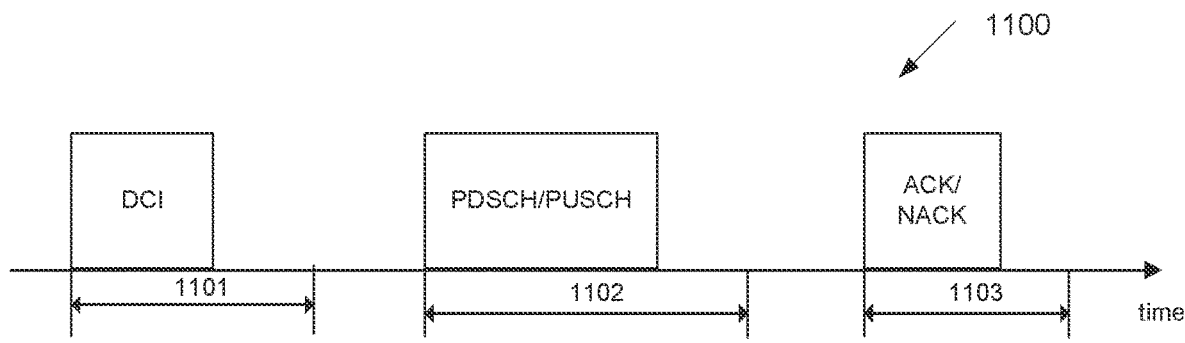
FIG. 11 illustrates an example timeline for applying a change to a value of $K_{min}^{PDSCH}$ based on an indication in a DCI format according to embodiments of the present disclosure.

FIG. 11 illustrates an example timeline 1100 for applying a change to a value of $K_{min}^{PDSCH}$ based on an indication in a DCI format according to embodiments of the present disclosure. An embodiment of the timeline 1100 shown in FIG. 11 is for illustration only.

In one example to determine the application delay, an indication to change a value for $K_{min}^{PDSCH}$ that is provided by a DCI format in a PDCCH reception in slot n is applied in slot n+X of the scheduling cell. The application delay X, as illustrated in 1101 of FIG. 11, can be determined in a same manner as an application delay for a minimum scheduling offset restriction.

In another example to determine the application delay, an indication to change a value for $K_{min}^{PDSCH}$ that is provided by a DCI format in a PDCCH reception in slot n is applied in slot n+X of the scheduled cell.

The UE can determine the application delay X, as illustrated in 1102, through any of the following: (1) X is predefined in the specification of the system operation, for example, X=1 slot; and (2) $X=K_{0,min}^{PDSCH}+Z$, where $K_{0,min}^{PDSCH}$ is a current $K_{min}^{PDSCH}$ value and Z is either a predetermined value or can be provided to the UE by higher layers, or can depend on a capability that the UE informs to a serving gNB. In one example, Z=1. In another example, Z can be determined per SCS, for example, Z=1 for SCS of 15 kHz, Z=1 for SCS of 30 kHz, Z=2 for SCS of 60 kHz, and Z=2 for of 120 kHz.

In yet another example to determine the application delay, an indication to change a value for $K_{min}^{PDSCH}$ that is provided by a DCI format such as a DCI format scheduling a PDSCH reception and triggering a PUCCH transmission with HARQ-ACK information in response to the PDSCH reception in slot n is applied in slot n+X of the scheduled cell. A UE can determine the application delay X, as illustrated in 1103 of FIG. 11, and X can be defined in the specification of the system operation, for example, X=1 slot or X=0 slot.

NR Rel-16 supports multi-TRPs. Multi-TRP technology in 5G not only handles the inter-cell interference (ICI) as in 4G, but also significantly improves spectral efficiency and reliability as well as boosts data transmission via aggregating resources from multi-TRPs. If a UE is configured by higher layer parameter PDCCH-Config that contains two different values of CORESETPoolIndex in ControlResourceSet for the active BWP of a serving cell, the UE may expect to receive multiple PDCCHs scheduling fully/partially/non-overlapped PDSCHs in time and frequency domain subject to UE capability. For the CORESET without CORESETPoolIndex, the UE may assume that the CORESET is assigned with CORESETPoolIndex as 0. Therefore, for multi-TRP in 5G NR system, a UE expects that multiple PDSCHs scheduled by multiple DCIs in respective CORESETs with different CORESETPoolIndex are transmitted from different TRPs.

The present disclosure relates to determining a DCI-based wake-up indication outside discontinuous reception (DRX) active time applicable across multi-TRPs for all configured serving cells. The disclosure also relates to determine dynamic secondary cell (SCell) dormancy behavior in terms of PDCCH monitoring across multi-TRPs, based on a DCI format during DRX active time or outside DRX active time. The disclosure further relates to determine search space set group switching across multiple TRPs, based on a DCI format within DRX active time.

In NR Rel-16, various UE power saving techniques have been introduced to extend battery life of mobile terminals without materially reducing the quality of service. To avoid unnecessary UE wake-ups during discontinuous reception in RRC_CONNECTED state (C-DRX), Rel-16 NR introduced support for signaling that indicates to the UE, prior to the start of next DRX cycle, whether or not the UE may start the drx-onDurationTimer timer and monitor PDCCH at the next DRX cycle.

The wake-up indication is provided by a new DCI format, DCI format 2_6 with CRC scrambled by PS-RNTI. So far, the wake-up indication has been applicable to all serving cells. However, for the active BWP of a serving cell, multiple CORESETs can be configured for PDCCH transmission from up to two TRPs. It's beneficial to consider wake-up indication applicable to different set of selected TRPs.

To increase throughput, a UE can be configured with one or more SCells in addition to primary cell (PCell) with carrier aggregation. For power saving purpose, a new UE behavior for SCell called dormancy behavior is defined in NR Rel-16. Dormancy behavior refers to a UE not monitoring PDCCH but continuing other activities such as CSI measurements, automatic gain control (AGC), and beam management. To reuse BWP framework, a dormant BWP without PDCCH configuration is introduced, and a UE can be switched to dormant or non-dormant BWP based on a SCell dormancy indication. So far, the dormancy indication is applicable to all available CORESETs in the active BWP of the respective SCells. However, for a SCell configured with CORESETs for PDCCH monitoring across multi-TRPs, it's beneficial to activate or deactivate PDCCH monitoring across TRPs for respective SCells. The SCell dormancy indication can be delivered to UEs either via DCI format 2_6 outside DRX active time or DCI format 1_1/0_1 during DRX active time.

Therefore, there is a need to support a DCI-based wake-up indication applicable to different set of selected TRPs outside DRX active time.

There is another need to support transition of SCell dormancy behaviors regarding PDCCH monitoring across multi-TRPs, based on a DCI format within DRX active time or outside DRX active time.

There is yet another need to support search space set group switching across multiple TRPs based on a DCI format within DRX active time.

In one embodiment, an indication is provided to a UE for PDCCH monitoring, for brevity referred to as "wake-up" indication, associated with DRX operation for the UE in RRC_CONNECTED state, wherein the wake-up indication is provided by a DCI format and is applicable across multiple TRPs of respective serving cell(s). In one example, the respective serving cell can be PCell. In another example, all serving cells are respective serving cells. For PDCCH receptions on a serving cell, a UE associates a TRP with a CORESET for a PDCCH reception through a value of a higher layer parameter CORESETPoolIndex for the CORESET where the UE is configured to monitor PDCCH according to a corresponding search space set.

In one example for providing a wake-up indication that is applicable across multiple CORESETs with different values of CORESETPoolIndex, a DCI format can provide a wake-up indication with size of $N \geq 1$ bits to indicate up to $2^N$ wake-up states to a UE that detects the DCI format. For a UE configured with DRX operation, a wake-up state can indicate to the UE whether or not the UE starts an associated drx-onDurationTimer at a number of next DRX cycle, such as one next DRX cycle, and also indicate CORESETPoolIndex values for PDCCH monitoring at least when the UE is indicated to start the drx-onDurationTimer.

A wake-up state for a UE can be any of the following: (1) the UE may not start the drx-onDurationTimer for the next DRX cycle. For example, this wake-up state can correspond to a value of the wake-up indication of "00"; (2) the UE starts the drx-onDurationTimer for the next DRX cycle and monitors PDCCH only in CORESETs with a CORESETPoolIndex value equal to "0" in the active BWP(s) of one or more respective serving cell(s), such as the PCell. For example, this wake-up state can correspond to a value of the wake-up indication of "01"; (3) the UE starts the drx-onDurationTimer for the next DRX cycle and monitors PDCCH only in CORESETs with a CORESETPoolIndex value equal to "1" in the active BWP(s) of one or more respective serving cell(s), such as the PCell. For example, this wake-up state can correspond to a value of the wake-up indication of "10"; and/or (4) the UE starts the drx-onDurationTimer for the next DRX cycle and monitors PDCCH in CORESETs with CORESETPoolIndex values of "0" or "1" in the active BWP(s) of one or more respective serving cell(s), such as the PCell. In one example, this wake-up state can correspond to a value of the wake-up indication of "10." In another example, this wake-up state can correspond to a value of the wake-up indication of "11."

The $2^N$ wake-up states can be either defined in the specification or provided to the UE through higher layers. A value, v (v=0, . . . , $2^N-1$) for the wake-up indication, can indicate (v+1)th predetermined wake-up state. When the UE receives a wake-up indication, the UE monitors PDCCH in the CORESETs with CORESETPoolIndex values according to the indicated wake-up state.

Figure 12:
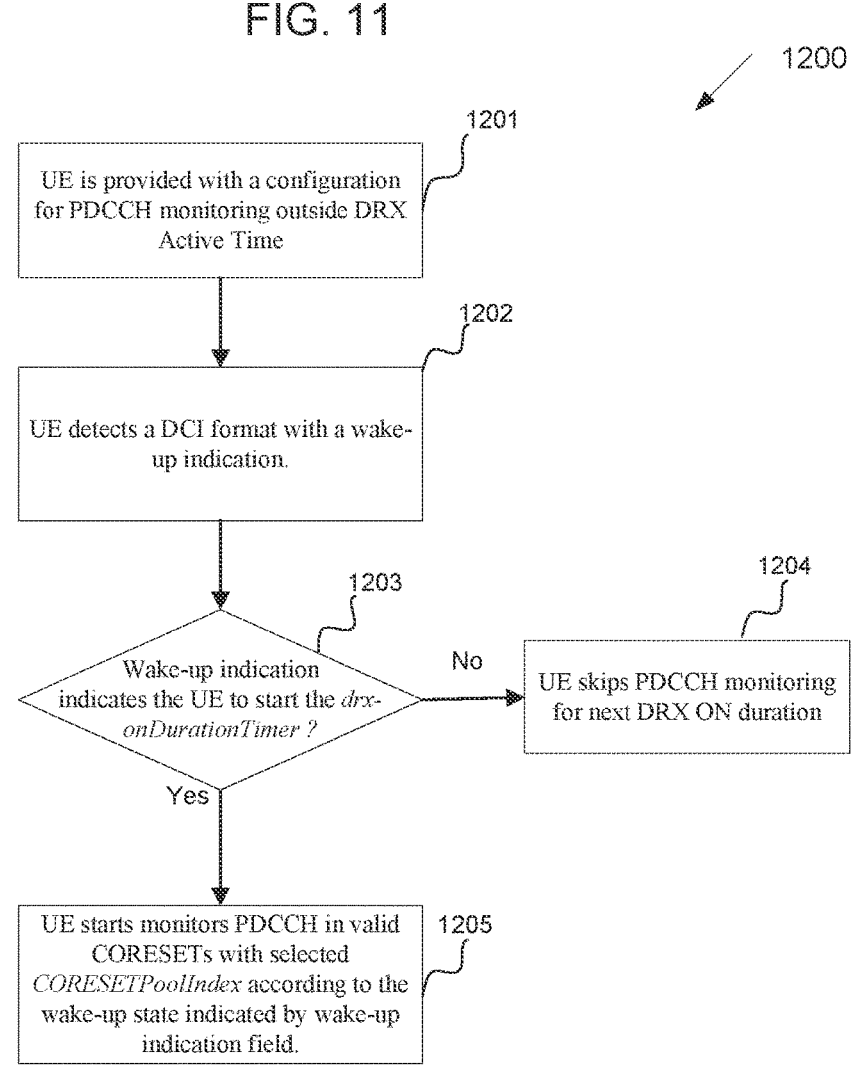
FIG. 12 illustrates a flowchart of a method for receiving an indication by a DCI format outside DRX active time for PDCCH monitoring in CORESETs associated with different values of a CORESETPoolIndex parameter according to embodiments of the present disclosure.

FIG. 12 illustrates a flowchart of a method 1200 for receiving an indication by a DCI format outside DRX active time for PDCCH monitoring in CORESETs associated with different values of a CORESETPoolIndex parameter according to embodiments of the present disclosure. For example, the method 1200 may be preformed by a UE such as UE 116 in FIG. 1. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, a UE is provided with a configuration for PDCCH monitoring outside DRX active time in an active DL BWP of the PCell or of the PSCell, at step 1201. The UE detects a DCI format with a wake-up indication field in a PDCCH monitoring occasion for the DCI format outside DRX active time, at step 1202. The UE then determines whether or not the UE is indicated to monitor PDCCH for detection of DCI formats associated with the drx-onDurationTimer for a number of next DRX ON durations such as one next DRX ON duration, at step 1203.

When the UE is indicated to not monitor PDCCH, for example by a value "00" of the wake-up indication field, the UE does not start the drx-onDurationTimer timer and skips PDCCH monitoring for the associated DCI format for the number of next DRX ON durations, at step 1204. When the UE is indicated to monitor PDCCH for the number of next DRX ON durations, for example by a value of the wake-up indication field other than "00," the UE starts the drx-onDurationTimer timer and monitors PDCCH for the associated DCI format in the active DL BWP of a respective serving cell in CORESETs with CORESETPoolIndex value indicated by the wake-up indication field value, at step 1205.

In one example for a wake-up indication applicable across multiple CORESETs with different CORESETPoolIndex values, including CORESETs without an associated CORESETPoolIndex value, a wake-up indication for PDCCH monitoring can indicate to a UE whether or not to start a drx-onDurationTimer timer for a number of next DRX cycles by indicating CORESETPoolIndex values for the active DL BWP when the UE is triggered to start the drx-onDurationTimer timer.

In one example, a set of $N_{BWP}>1$ BWPs can be configured to a UE by higher layers associated with wake-up indication per respective serving cell. In one example, the respective serving cell can be PCell. In another example, all serving cells are respective serving cells. The set of BWPs is referred to as BWPs-for-wakeup. Each BWP in BWPs-for-wakeup has different configurations for CORESETPoolIndex values associated with CORESETs for PDCCH monitoring in the BWP. For a CORESET where CORESETPoolIndex is not provided, a CORESETPoolIndex value is assumed to be 0.

Any of the following can apply regarding the configuration of BWPs-for-wakeup for one or more respective serving cell(s): (1) there is a first BWP in BWPs-for-wakeup where the UE is not provided CORESETPoolIndex for any CORESET for PDCCH monitoring within DRX active time. The first BWP is referred to as default BWP in this disclosure. For example, the first BWP can be the first BWP in BWPs-for-wakeup; (2) there is a second BWP in BWPs-for-wakeup where the UE is either not provided CORESETPoolIndex or is provided CORESETPoolIndex with value "0" for CORESETs where the UE monitors PDCCH within DRX active time. For example, the second BWP can be the second BWP in BWPs-for-wakeup. It is also possible that a BWP where the UE is not provided CORESETPoolIndex for any CORESET and a BWP where the UE is provided CORESETPoolIndex only with value of "0" are considered to be same BWPs for the purposes of indication for PDCCH monitoring; (3) there is a third BWP in BWPs-for-wakeup where the UE is provided CORESETPoolIndex with value of "1" for CORESETs for PDCCH monitoring within DRX active time. For example, the third BWP can be the third BWP in BWPs-for-wakeup; and/or (4) there is a fourth BWP in BWPs-for-wakeup where the UE is provided CORESETPoolIndex with value of "0" or "1" for CORESETs for PDCCH monitoring within DRX active time. For example, the fourth BWP can be the fourth BWP in BWPs-for-wakeup.

A wake-up indication provides an index to BWPs-for-wakeup. A value, v (v=, ..., $N_{BWP}-1$), for the wake-up indication indicates the (v+1)th BWP from BWPs-for-wakeup, where $N_{BWP}$ is the size of BWPs-for-wakeup. The indicated BWP is the active DL BWP for the corresponding serving cell.

Figure 13:
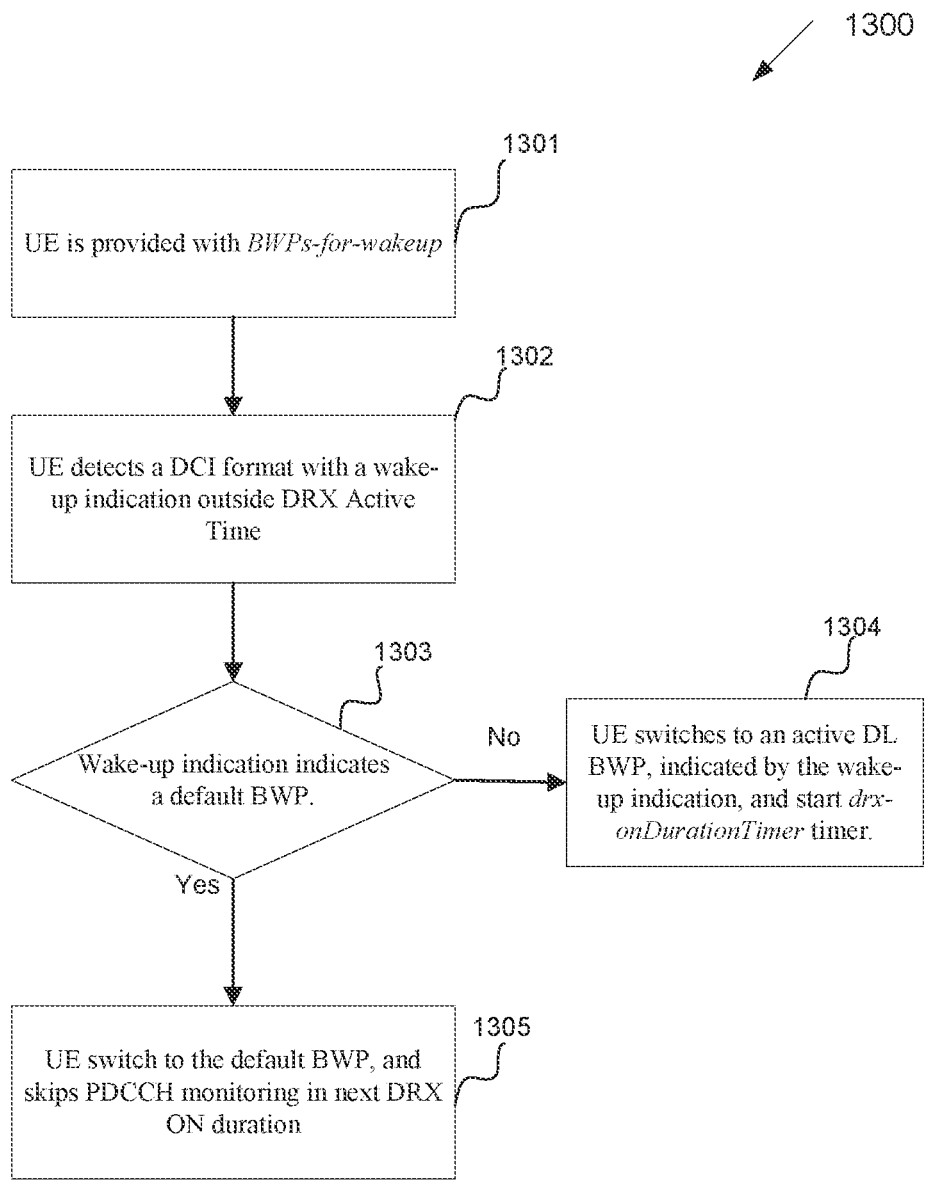
FIG. 13 illustrates another flowchart of a method for receiving an indication by a DCI format outside DRX active time for PDCCH monitoring in CORESETs associated with different values of a CORESETPoolIndex parameter according to embodiments of the present disclosure.

FIG. 13 illustrates another flowchart of a method 1300 for receiving an indication by a DCI format outside DRX active time for PDCCH monitoring in CORESETs associated with different values of a CORESETPoolIndex parameter according to embodiments of the present disclosure. For example, the method 1300 may be preformed by a UE such as UE 116 in FIG. 1. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, a UE can be provided with a set of BWPs, BWPs-for-wakeup, associated with a wake-up indication outside DRX active time for PDCCH monitoring in CORESETs associated with multiple values of CORESETPoolIndex, at step 1301. When the UE detects a DCI format with a wake-up indication, at step 1302, the UE determines whether or not the wake-up indication indicates the UE to switch to a default BWP in BWPs-for-wakeup, at step 1303. If the wake-up indication indicates to the UE to switch to the default BWP, for example when a value of the wake-up indication is "0," the UE switches to the default BWP and does not start the drx-onDurationTimer for a number of next DRX cycle, such as one DRX cycle, at step 1305. Otherwise, the UE starts the drx-onDurationTimer and switches to the active DL BWP, indicated by the wake-up indication, at step 1304. In one example, wake-up indication with value of "1" can indicate a second BWP in BWPs-for-wakeup, and CORESET for PDCCH monitoring in the second BWP can be configured only a value of CORESETPoolIndex equal to "0."

In one embodiment, SCell dormancy indication is provided to a UE, by means of a DCI format, that is applicable across subsets of CORESETs of activated SCells.

In one example for SCell dormancy indication across CORESETs, a set of one or more BWPs can be configured by higher layers for each serving cell for SCell dormancy indication. The set of BWP is referred as BWPs-for-dormancy in this disclosure. At least two BWPs from BWPs-for-dormancy have a different configuration for a CORESETPoolIndex value of CORESETs with corresponding search space sets for PDCCH monitoring.

A SCell dormancy indication field can consist of N≥1 blocks. The size of N is determined by a number of SCell groups configured by higher layers, for example by a Scell-groups-for-dormancy parameter, where the i-th (i=1, ..., N) block corresponds to the i-th Scell group.

A block in the SCell dormancy indication field consists of M≥1 bits. For example, a value of M can be such that M=⌈log$_2$(Z)⌉, where Z is the size of BWPs-for-dormancy for configured SCells in the corresponding SCell group. For example, if the size of BWPs-for-dormancy for SCells in a SCell group is different, Z can be equal to the maximum size of BWPs-for-dormancy among all configured SCells in a SCell group.

Any of the following can apply regarding the configuration of BWPs-for-dormancy for a respective SCell: (1) there is a first BWP in BWPs-for-dormancy where the UE is not provided CORESETPoolIndex for any CORESET for PDCCH monitoring within DRX active time. For example, the first BWP can be the first BWP in BWPs-for-dormancy; (2) there is a second BWP in BWPs-for-dormancy where the UE is provided CORESETPoolIndex with value of "0" for CORESETs for PDCCH monitoring within DRX active time. For example, the second BWP can be the second BWP in BWPs-for-dormancy. It is also possible that a BWP where the UE is not provided CORESETPoolIndex for any CORESET and a BWP where the UE is provided CORESETPoolIndex only with value of "0" are considered to be same BWPs for the purposes of indication for PDCCH monitoring; (3) there is a third BWP in BWPs-for-dormancy where the UE is provided CORESETPoolIndex with value of "1" for CORESETs for PDCCH monitoring within DRX active time. For example, the third BWP can be the third BWP in BWPs-for-dormancy; and/or (4) there is a fourth BWP in BWPs-for-dormancy t where the UE is provided CORESETPoolIndex with value of "0" or "1" for CORESETs for PDCCH monitoring. For example, the fourth BWP can be the fourth BWP in BWPs-for-dormancy.

The value v, (v=0, ..., $2^M$−1), for the i-th block in a SCell dormancy indication indicates an active DL BWP, provided by the (v+1)th BWP from BWPs-for-dormancy, for activated SCells in i-th SCell group. When a UE receives a SCell dormancy indication, the UE monitors PDCCH in CORESETs with indicated CORESETPoolIndex values according to the configuration of the corresponding active DL BWP.

Figure 14:
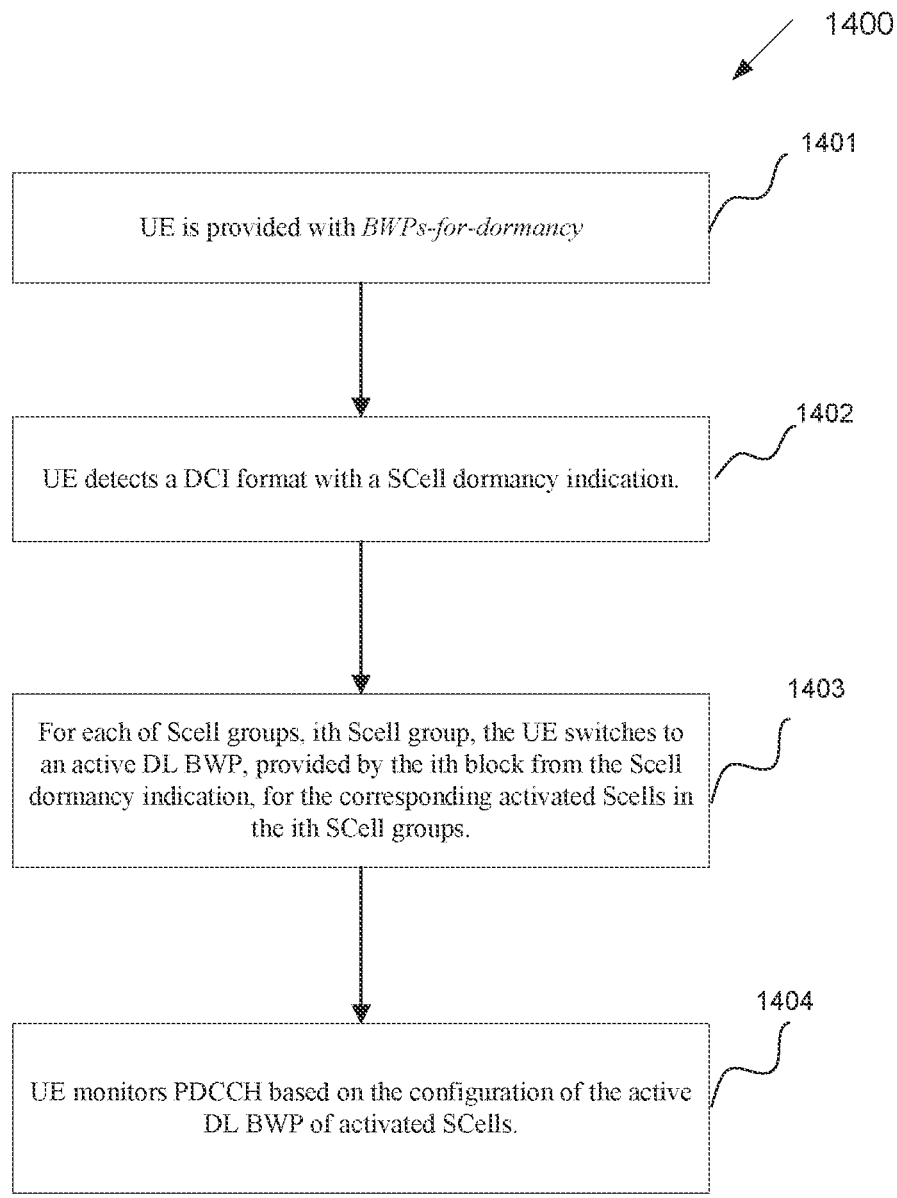
FIG. 14 illustrates a flowchart of a method for transitioning between dormancy and non-dormancy behavior for activated SCells according to embodiments of the present disclosure.

FIG. 14 illustrates a flowchart of a method 1400 for transitioning between dormancy and non-dormancy behavior for activated SCells according to embodiments of the present disclosure. For example, the method 1400 may be preformed by a UE such as UE 116 in FIG. 1. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, a UE is provided by BWPs-for-dormancy a configuration of BWPs associated with SCell dormancy transition per serving cell, at step 1401. The UE detects a DCI format with a SCell dormancy indication field, at step 1402. For each group of SCell groups, such as the i-th SCell group, the UE switches to an active DL BWP, provided by the i-th block from the SCell dormancy indication, for the activated SCells in the i-th SCell group, at step 1403. The value v, (v=0, ..., $2^M$−1), for the i-th block in a SCell dormancy indication indicates an active DL BWP, provided by the (v+1)th BWP from BWPs-for-dormancy, for activated SCells in i-th SCell group. The UE monitors PDCCH across one or more CORESETs based on the configuration of the active DL BWP of active SCells, at step 1404.

In one example for SCell dormancy indication across CORESETs with multiple values of CORESETPoolIndex, the SCell dormancy indication with size of $N_2$≥1 bits can be used to indicate up to $2^{N_2}$ dormancy states applicable to all activated SCells to a UE that detects the DCI format. A dormancy state can indicate the UE a CORESETPoolIndex value for CORESETs for PDCCH monitoring in the active DL BWP of activated SCells.

A dormancy state can be any of the following: (1) the UE does not monitor PDCCH in any CORESETs in the active BWP of an activated SCell. This dormancy state can be activated when a value of the dormancy indication field for the SCell is "00"; (2) the UE monitors PDCCH in CORESETs with CORESETPoolIndex value equal to "0" in the active BWP of an activated SCell. This dormancy state can be activated when a value of the dormancy indication field for the SCell is "01"; (3) the UE monitors PDCCH in CORESETs with CORESETPoolIndex value equal to "1" in the active BWP of an activated SCell. This dormancy state can be activated when a value of the dormancy indication field for the SCell is "10"; and/or (4) the UE monitors PDCCH in CORESETs with CORESETPoolIndex value equal to "0" or "1" in the active BWP of an activated SCell. In one example, this dormancy state can be activated when a value of the dormancy indication field for the SCell is "10"; In another example, this dormancy state can be activated when a value of the dormancy indication field for the SCell is "11."

The N dormancy states can be either defined in the specification or provided to a UE through higher layer signaling. A value, v (v=0, ..., $2^N$−1) for the dormancy indication, can indicate (v+1)th predetermined dormancy state. When a UE receives a SCell dormancy indication, the UE monitors PDCCH in the CORESETs with indicated CORESETPoolIndex values according to the dormancy state of the corresponding SCell dormancy indication.

Figure 15:
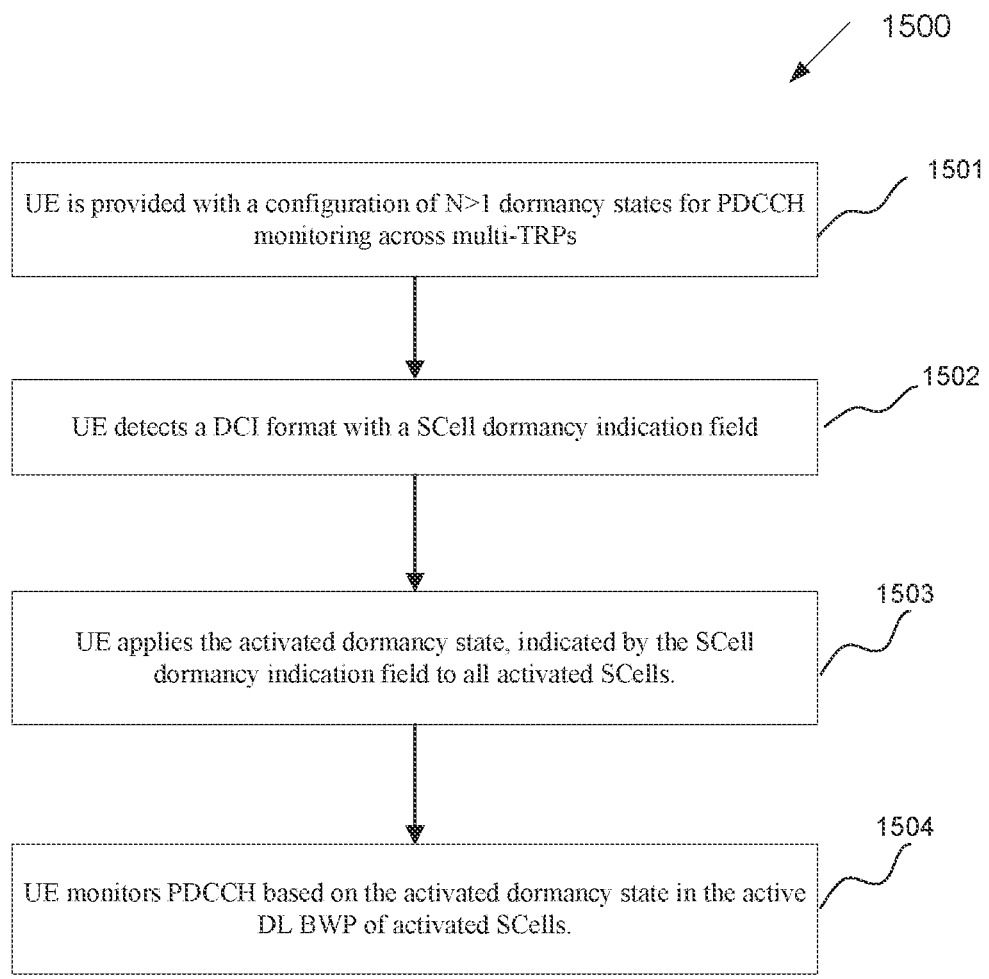
FIG. 15 illustrates a flowchart of a method for transitioning between dormancy and non-dormancy behavior for activated SCells according to embodiments of the present disclosure.

FIG. 15 illustrates a flowchart of a method 1500 for transitioning between dormancy and non-dormancy behavior for activated SCells according to embodiments of the present disclosure. For example, the method 1500 may be preformed by a UE such as UE 116 in FIG. 1. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, a UE is provided with a configuration on N>1 dormancy states for PDCCH monitoring behaviors across multiple CORESETs, at step 1501. The UE detects a DCI format with a SCell dormancy indication field, at step 1502. The UE then applies an activated dormancy state that is indicated by the SCell dormancy indication field to an activated SCell from a group of one or more SCells, at step 1503. The value, v (v=, ..., N−1), for SCell dormancy indication, indicates the (v+1)-th configured dormancy state. The UE monitors PDCCH based on the activated dormancy state in the active DL BWP of the activated SCell, at step 1504.

In one example for detecting a DCI format for SCell dormancy indication, a UE can monitor PDCCH for detecting the DCI format with SCell dormancy indication outside DRX active time. For example, the DCI format can be a DCI format with CRC scrambled by PS-RNTI in PCell or PSCell. When the UE monitors PDCCH for detecting the DCI format in a common search space, the UE can be provided by higher layers a location of the dormancy indication field for the UE in the DCI format.

In another example for detecting a DCI format for SCell dormancy indication, a UE can monitor PDCCH for detecting the DCI format with SCell dormancy indication during DRX active time. For example, the DCI format can be a DCI format with CRC scrambled by a C-RNTI and a corresponding PDCCH can be received in a CORESET on the PCell or the PSCell.

In one embodiment for SCell dormancy indication across CORESETs with multiple values of CORESETPoolIndex, a cell can be partitioned into one or two cells, for the purposes of dormancy indication, according to values of CORESET-PoolIndex.

For example, when a UE: (1) is not provided CORESET-PoolIndex or is provided CORESETPoolIndex with a value of 0 for first CORESETs on active DL BWPs of serving cells; and (2) is provided CORESETPoolIndex with a value of 1 for second CORESETs on active DL BWPs of the serving cells, then: (1) a serving cell is placed in a first set $S_0$ of $N_{cells}^{DL,0}$ serving cells if the serving cell includes a first CORESET; and (2) a serving cell is placed in a second set $S_1$ of $N_{cells}^{DL,1}$ serving cells if the serving cell includes a second CORESET.

Serving cells can be placed in a set according to an ascending order of a serving cell index. Then, for a set $S=S_0 \cup S_1$ of $N_{cells}^{DL}=N_{cells}^{DL,0}+N_{cells}^{DL,1}$ serving cells, the set S of $N_{cells}^{DL}$ cells can be partitioned into groups of cells and a DCI format can indicate dormancy or non-dormancy UE behavior for each group of cells.

In one example, the PCell or the PSCell may not be included in the set of cells, at least for the first set $S_0$ of $N_{cells}^{DL,0}$ serving cells. This can ensure that a UE can always monitor PDCCH on the PCell, including for DCI formats associated with search space sets where PDCCH monitoring is according to a common search space, while simplifying the signaling associated with defining the groups of cells.

In one example, a group of cells can include only cells from the second set $S_1$ of $N_{cells}^{DL,1}$ serving cells while indication for dormancy/non-dormancy behavior for a group of cells from the first set $S_0$ of $N_{cells}^{DL,0}$ serving cells can be separately provided by a same of different DCI format.

In one example, when dormancy behavior is indicated for a first group of cells from the first set $S_0$ of $N_{cells}^{DL,0}$ serving cells, dormancy behavior can be default for a second group of cells from the second set $S_1$ of $N_{cells}^{DL,1}$ serving cells when the second group of cells in a subset of the first group of cells. Equivalently, when dormancy behavior is indicated for PDCCH monitoring in the first CORESETs of a serving cell, dormancy behavior is default for PDCCH monitoring in the second CORESETs of the serving cells.

In one embodiment, a search space set group switching to a UE is provided, by means of a DCI format, that is applicable across subsets of CORESETs of serving cells. The applicable search space sets can be Type3-PDCCH CSS set or USS set. A search space set group switching field can be included in a DCI format to indicate a group of search space sets for PDCCH monitoring in one or more serving cells.

When a UE is configured with more than one serving cells, the DCI format for triggering search space set group switching can include more than one search space set switching fields, and each of the search space set group switching fields is used to indicate search space set group switching for a cell group. In one variation, the number of search space set group switching fields is same as the number of configured cell groups, and the i-th search space set group switching field is used to indicate search space set group switching for the i-th cell group. In another variation, the number of search space set group switching fields can be less than the number of configured cell groups, and i-th search space set group switching field is used to indicate the i-th cell group that is not in dormancy state.

When a UE receives a DCI format includes one or more search space set group switching field(s), the UE starts monitoring PDCCH according to search space sets indicated by the one or more search space set group switching field(s), and stops monitoring PDCCH according to other search space sets, at a first slot that is at least T_dealy symbols/slots after the last symbol/slot of the PDCCH with the DCI format.

A UE can be provided with a timer value for switching back to a default search space set group, denoted as T0. when the UE starts PDCCH monitoring in search space sets indicated by a DCI format, the UE sets a timer value to T0. When the timer expires, the UE starts monitoring PDCCH according to search space sets from the default search space set group and stops monitoring PDCCH according to search space sets outside the default search space set group.

When a UE does not receive any DCI format for triggering search space set group switching, the UE monitors PDCCH according to search space sets from the default search space set group.

A UE can determine a default search space set group with default search space sets for PDCCH monitoring according to any of the following methods.

In one example, a UE can be provided by higher layers a default search space set group, and the UE determines that the default search space sets are configured search space sets from the default search space set group.

In another example, the UE assumes all applicable search space sets configured to UEs are default search space sets.

In yet another example, the UE determines search space sets from search space set group 0 are default search space sets.

In yet another example, the UE determines that search space sets associated with CORESET group 0 are default search space sets.

Figure 16:
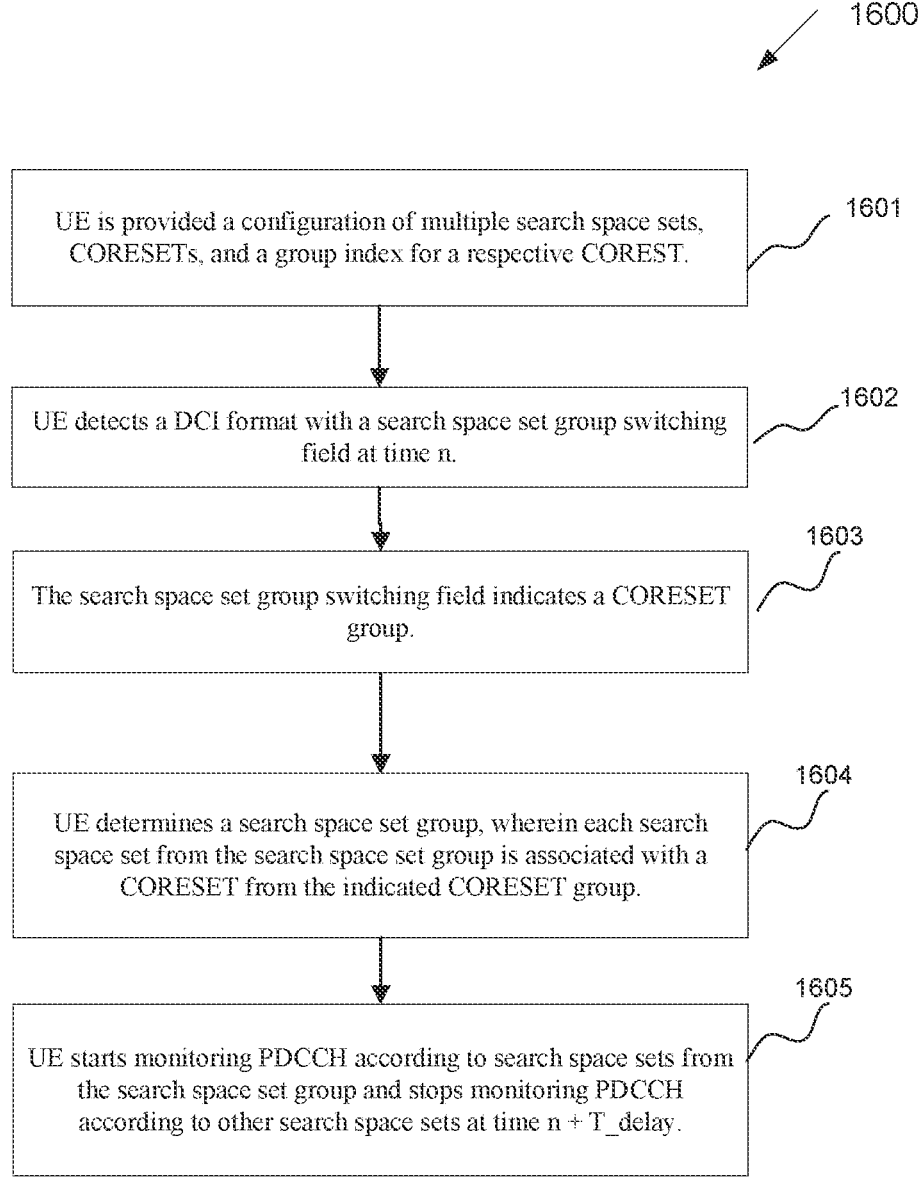
FIG. 16 illustrates a flowchart of a method for a search space set group switching across multiple TRPs based on a DCI format according to embodiments of the present disclosure.

FIG. 16 illustrates a flowchart of a method 1600 for a search space set group switching across multiple TRPs based on a DCI format according to embodiments of the present disclosure. For example, the method 1600 may be preformed by a UE such as UE 116 in FIG. 1. An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

As illustrated in FIG. 16, a UE is provided a configuration of multiple search space sets, CORESETs, and a group index for a respective CORESET, at step 1601. The configured CORESETs are divided into multiple CORESET groups according to the group index. A UE detects a DCI format with a search space set group switching field at time n, at step 1602. The search space set group switching field indicates a CORESET group, at step 1603. The UE then determines a search space set group, wherein each search space set from the search space set group is associated with a CORESET from the indicated CORESET group, at step 1604. The UE starts monitoring PDCCH according to search space sets from the search space set group and stops monitoring PDCCH according to other search space sets at time n+T_delay, at step 1605.

In one example, for SS set switching across multiple TRPs, a UE can be provided a group index for a respective CORESET, for example, CORESETPoolIndex, for PDCCH reception on a serving cell. CORESETs configured to a UE can be divided into N>=1 CORSET groups according to the group index. A search space set group switching field indicates a CORESET group index. For example, the value of the SS set group switching field is a CORESET group index. When a UE receives a DCI format includes the search space set group switching field, the UE switches to respective search space sets for PDCCH monitoring, wherein each of the respective search space sets is associated with a CORESET from the indicated CORESET group.

In one example for SS set switching across multiple TRPs, a UE can be provided with a first group index for a respective SS set for PDCCH monitoring, and a second group index for a respective CORESET for PDCCH reception on a serving cell, for example CORESETPoolIndex. Applicable search space sets configured to a UE can be divided into M>=1 SS set groups according to the first group index, while CORESETs configured to the UE can be divided into N>=1 CORSET groups according to the second group index. A search space set group switching field is composed of a first indication to indicate a SS set group and a second indication to indicate a CORESET group. When a UE receives a DCI format that includes the search space set group switching field, the UE switches to respective search space sets for PDCCH monitoring, wherein each of the respective search space sets is from the indicated SS set group and is associated with a CORESET from the indicated CORESET group.

In one example for SS set switching across multiple TRPs, a UE can be provided with a first group index for a respective SS set for PDCCH monitoring, and a second group index for a respective CORESET for PDCCH reception on a serving cell, for example CORESETPoolIndex. Applicable search space sets configured to a UE can be divided into M>=1 SS set groups according to the first group index, while CORESETs configured to the UE can be divided into N>=1 CORSET groups according to the second group index. A SS set group switching field is composed of N blocks to indicate N search space set groups associated with N CORESET groups, such that i-th block indicates a search space set group associated with i-th CORESET group.

When a UE receives a DCI format includes the SS set group switching field, the UE determines a search space set group for each of the N CORESET groups based on a block from the SS set group switching field, wherein the search space set group for the i-th CORESET group is determined based on the value of i-th block in the SS set group switching field. The UE switches to respective search space sets for PDCCH monitoring from the N indicated search space set groups, wherein each of the respective search space sets from the i-th indicated search space set group is associated with a CORESET from i-th CORESET group.

M or N can be either provided to the UE by higher layers or predefined in the specification of system, e.g., 2. For example, when M=N=2, the SS set group switching field has two binary bits. A UE may receive a DCI format includes the SS set group switching field with any of the following value.

In one example, "00" indicates search space set group index 0 for CORESET group index 0, and search space set group index 0 for CORESET group index 1. If a UE detects a DCI format with SS set group switching field of "00," the UE starts monitors PDCCH in search space sets from search space set group 0 that are associated with CORESETs from CORESET group 0 or CORESET group 1.

In one example, "01" indicates search space set group index 0 for CORESET group index 0, and search space set group index 1 for CORESET group index 1. If a UE detects a DCI format with SS set group switching field of "01," the UE starts monitors PDCCH in search space sets from search space set group 0 that are associated with CORESETs from CORESET group 0, and in search space sets from search space set group 1 that are associated with CORESETs from CORESET group 1.

In one example "10" indicates search space set group index 1 for CORESET group index 0, and search space set group index 0 for CORESET group index 1. If a UE detects a DCI format with SS set group switching field of "10," the UE starts monitors PDCCH in search space sets from search space set group 1 that are associated with CORESETs from CORESET group 1, and in search space sets from search space set group 0 that are associated with CORESETs from CORESET group 0.

In one example, "11" indicates search space set group index 1 for CORESET group index 0, and search space set group index 1 for CORESET group index 1. If a UE detects a DCI format with SS set group switching field of "11," the UE starts monitors PDCCH in search space sets from search space set group 1 that are associated with CORESETs from CORESET group 0 or CORESET group 1.

In one example, a CORESET group can include all configured CORESETs, for example CORESET group with index of 0.

In another example, a search space set group can be empty, such that no search space set is provided with the empty SS set group index, for example group index of 0. When a UE receives a DCI format includes an indication of an empty SS set group associated with a CORESET group, the UE does not expect to receive PDCCH in CORESETs from the associated CORESET group.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
 a transceiver configured to receive:
  a configuration for a set of search space sets, wherein a search space set provides parameters for physical downlink control channel (PDCCH) receptions and wherein the parameters include:
   time-frequency resources of a control resource set (CORESET) for the PDCCH receptions, and
   a group index for the CORESET, and
  a PDCCH that provides a downlink control information (DCI) format, wherein the DCI format includes a field providing an indication of a CORESET group index; and a processor operably coupled to the transceiver, the processor configured to determine, based on the indication, a group of search space sets in which to receive PDCCHs, wherein the group of search space sets includes each search space set from the set of search space sets that is associated with a CORESET having the CORESET group index, and wherein the transceiver is further configured to receive the PDCCHs according to the group of search space sets.

2. The UE of claim 1, wherein the processor is further configured to determine based on the field:
a downlink bandwidth part (BWP) index for a group of serving cells, or
to start an on duration timer for a next discontinuous reception (DRX) cycle.

3. The UE of claim 1, wherein the processor is further configured to instruct the transceiver to skip reception of PDCCHs according to search space sets that are not in the determined group of search space sets.

4. The UE of claim 1, wherein:
the transceiver is further configured to receive a configuration for a timer value; and
the processor is further configured to determine a default index for a CORESET group when a time from a last PDCCH reception that provides a DCI format that includes the field is larger than the timer value.

5. The UE of claim 1, wherein:
more than one group of search space sets include search space sets that are associated with CORESETs having the CORESET group index,
the group of search space sets has an index, and
the processor is further configured to determine the index of the group of search space sets based on one of:
the indication by the field in the DCI format, and
a second indication by a second field in the DCI format.

6. The UE of claim 1, wherein:
the transceiver is further configured to receive a physical downlink shared channel (PDSCH) providing one or more transport blocks (TBs),
the processor is further configured to determine a time for a physical uplink control channel (PUCCH) transmission with hybrid automatic repeat request acknowledgement (HARQ-ACK) information in response to reception of the one or more TBs,
a time offset between the PDSCH reception and the PUCCH transmission is not smaller than a minimum PDSCH processing time value,
the minimum PDSCH processing time value is indicated by a second field in the DCI format, and
the transceiver is further configured to transmit the PUCCH.

7. The UE of claim 6, wherein:
the transceiver is further configured receive a configuration for a set of minimum PDSCH processing time values, and
the minimum PDSCH processing time value is from the set of minimum PDSCH processing time values.

8. A base station comprising:
a transceiver configured to transmit:
a configuration for a set of search space sets, wherein a search space set provides parameters for physical downlink control channel (PDCCH) transmissions and wherein the parameters include:
time-frequency resources of a control resource set (CORESET) for the PDCCH transmissions, and
a group index for the CORESET, and a PDCCH that provides a downlink control information (DCI) format, wherein the DCI format includes a field providing an indication of a CORESET group index; and a processor operably coupled to the transceiver, the processor configured to determine a group of search space sets in which to transmit PDCCHs and to indicate via the indication, wherein the group of search space sets includes each search space set from the set of search space sets that is associated with a CORESET having the CORESET group index, and wherein the transceiver is further configured to transmit the PDCCHs according to the group of search space sets.

9. The base station of claim 8, wherein the processor is further configured to indicate based on the field:
a downlink bandwidth part (BWP) index for a group of serving cells, or
to start an on duration timer for a next discontinuous reception (DRX) cycle.

10. The base station of claim 8, wherein the processor is further configured to instruct the transceiver to skip transmission of PDCCHs according to search space sets that are not in the determined group of search space sets.

11. The base station of claim 8, wherein:
the transceiver is further configured to transmit a configuration for a timer value; and
the processor is further configured to determine a default index for a CORESET group when a time from a last PDCCH transmission that provides a DCI format that includes the field is larger than the timer value.

12. The base station of claim 8, wherein:
more than one group of search space sets include search space sets that are associated with CORESETs having the CORESET group index,
the group of search space sets has an index, and
the processor is further configured to indicate the index of the group of search space sets based on one of:
the indication by the field in the DCI format, and
a second indication by a second field in the DCI format.

13. The base station of claim 8, wherein:
the transceiver is further configured to transmit a physical downlink shared channel (PDSCH) providing one or more transport blocks (TBs),
the processor is further configured to determine a time for a physical uplink control channel (PUCCH) reception with hybrid automatic repeat request acknowledgement (HARQ-ACK) information in response to transmission of the one or more TB s,
a time offset between the PDSCH transmission and the PUCCH reception is not smaller than a minimum PDSCH processing time value,
the minimum PDSCH processing time value is indicated by a second field in the DCI format, and
the transceiver is further configured to receive the PUCCH.

14. The base station of claim 13, wherein:
the transceiver is further configured transmit a configuration for a set of minimum PDSCH processing time values, and
the minimum PDSCH processing time value is from the set of minimum PDSCH processing time values.

15. A method comprising:
receiving a configuration for a set of search space sets, wherein a search space set provides parameters for physical downlink control channel (PDCCH) receptions and wherein the parameters include:

time-frequency resources of a control resource set (CORESET) for the PDCCH receptions, and
a group index for the CORESET, and
receiving a PDCCH that provides a downlink control information (DCI) format, wherein the DCI format includes a field providing an indication of a CORESET group index;
determining based on the indication, a group of search space sets in which to receive PDCCHs, wherein the group of search space sets includes each search space set from the set of search space sets that is associated with a CORESET having the CORESET group index; and
receiving the PDCCHs according to the group of search space sets.

16. The method of claim 15, further comprising determining based on the field:
a downlink bandwidth part (BWP) index for a group of serving cells, or
to start an on duration timer for a next discontinuous reception (DRX) cycle.

17. The method of claim 15, further comprising:
skipping reception of PDCCHs according to search space sets that are not in the determined group of search space sets;
receiving a configuration for a timer value; and
determining a default index for a CORESET group when a time from a last PDCCH reception that provides a DCI format that includes the field is larger than the timer value.

18. The method of claim 15, further comprising:
determining more than one group of search space sets that include search space sets that are associated with CORESETs having the CORESET group index;
determining the group of search space sets that has an index; and
determining the index of the group of search space sets based on one of:
the indication by the field in the DCI format, and
a second indication by a second field in the DCI format.

19. The method of claim 15, further comprising:
receiving a physical downlink shared channel (PDSCH) providing one or more transport blocks (TBs);
determining a time for a physical uplink control channel (PUCCH) transmission with hybrid automatic repeat request acknowledgement (HARQ-ACK) information in response to reception of the one or more TBs, wherein:
a time offset between the PDSCH reception and the PUCCH transmission is not smaller than a minimum PDSCH processing time value, and
the minimum PDSCH processing time value is indicated by a second field in the DCI format; and
transmitting the PUCCH.

20. The method of claim 19, further comprising:
receiving a configuration for a set of minimum PDSCH processing time values, and
determining the minimum PDSCH processing time value from the set of minimum PDSCH processing time values.

* * * * *